US012669592B1

(12) United States Patent

Rajagopalan et al.

(10) Patent No.: US 12,669,592 B1

(45) Date of Patent: Jun. 30, 2026

(54) FIDUCIAL-BASED LIDAR MALFUNCTION DETECTION FOR AUTONOMOUS MOTILE DEVICES

(71) Applicant: Amazon Technologies, Inc., Seattle, WA (US)

(72) Inventors: Srinivasa Varadan Rajagopalan, Milpitas, CA (US); Casey Kute Schulz, San Jose, CA (US); Chen Wang, Fremont, CA (US); Daimian Wang, Fremont, CA (US); Rui Zhang, Palo Alto, CA (US); Lei Zhu, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1179 days.

(21) Appl. No.: 17/544,674

(22) Filed: Dec. 7, 2021

(51) Int. Cl.
| | |
|---|---|
| *G01S 7/497* | (2006.01) |
| *G01S 17/89* | (2020.01) |
| *G05D 1/00* | (2006.01) |

(52) U.S. Cl.
CPC .............. *G01S 7/497* (2013.01); *G01S 17/89* (2013.01); *G05D 1/0088* (2013.01); *G05D 1/0219* (2013.01); *G05D 1/0248* (2013.01); *G01S 2007/4975* (2013.01)

(58) Field of Classification Search
CPC .. G01S 7/497; G01S 17/89; G01S 2007/4975; G05D 1/0088; G05D 1/0219; G05D 1/0248
See application file for complete search history.

(56) References Cited

U.S. PATENT DOCUMENTS

| | | | | |
|---|---|---|---|---|
| 10,857,679 | B1 * | 12/2020 | Cousins | G05D 1/0246 |
| 11,409,295 | B1 * | 8/2022 | Samdaria | G05D 1/0217 |
| 2013/0016876 | A1 * | 1/2013 | Wooley | H04N 23/61 382/103 |
| 2017/0261993 | A1 * | 9/2017 | Venable | G05D 1/0272 |

(Continued)

FOREIGN PATENT DOCUMENTS

| | | | | | |
|---|---|---|---|---|---|
| AU | 2013263851 | A1 * | 1/2014 | | B25J 11/009 |
| CA | 2928262 | C * | 6/2018 | | B25J 11/009 |

OTHER PUBLICATIONS

Huang et al. (doc. "LiDARTag: A Real-Time Fiducial Tag System for Point Clouds" Jul. 2021.*

(Continued)

*Primary Examiner* — Assres H Woldemaryam

(74) *Attorney, Agent, or Firm* — Eversheds Sutherland (US) LLP

(57) ABSTRACT

An autonomous motile device (AMD) may include a light detection and ranging (LIDAR) subsystem that is usable for floor detection. The LIDAR subsystem may include a LIDAR component and a fiducial disposed in a path of light emitted by the LIDAR component. The LIDAR component provides distance data to a processor, the distance data comprising one or more distance values based at least in part on light emitted towards the fiducial. The processor determines a value based on the distance data, and determines whether the value is outside of a predetermined range of values. If the value is out of bounds, this may be indicative of the LIDAR component having malfunctioned, and the processor may cause the AMD to perform an action in response to the LIDAR malfunction.

20 Claims, 9 Drawing Sheets

(56) References Cited

U.S. PATENT DOCUMENTS

| | | | |
|---|---|---|---|
| 2018/0088234 A1* | 3/2018 | Scherer | G01S 17/42 |
| 2018/0161986 A1* | 6/2018 | Kee | G06V 20/10 |
| 2019/0056484 A1* | 2/2019 | Bradley | G01S 7/4815 |
| 2019/0104295 A1* | 4/2019 | Wendel | G01B 11/2504 |
| 2020/0073401 A1* | 3/2020 | Szatmary | B60T 7/00 |
| 2021/0001477 A1* | 1/2021 | Jung | B25J 9/126 |
| 2021/0026368 A1* | 1/2021 | Cochran | G05D 1/249 |
| 2021/0034066 A1* | 2/2021 | Jung | B25J 11/00 |
| 2021/0065241 A1* | 3/2021 | Chakravarty | G06Q 30/0261 |
| 2021/0072396 A1* | 3/2021 | Wang | H04N 23/73 |
| 2021/0294328 A1* | 9/2021 | Dhayalkar | G06T 7/73 |
| 2021/0318149 A1* | 10/2021 | Chang | G01S 13/867 |

OTHER PUBLICATIONS

Ortiz-Fernandez et al. (doc. "Smart Artificial Markers for Accurate Visual Mapping and Localization"), Jan. 18, 2021.*
Ross et al. (doc. "Fiducial Marker Navigation for Mobile Robots"), Nov. 2012.*

\* cited by examiner

RECEIVE, FROM LIDAR COMPONENT, AND BASED ON LIGHT EMITTED TOWARDS A FIDUCIAL, DISTANCE DATA COMPRISING ONE OR MORE DISTANCE VALUES — 118

DETERMINE A VALUE BASED ON THE DISTANCE DATA — 120

OUTSIDE OF PREDETERMINED RANGE OF VALUES? — 122
NO / YES

PERFORM ACTION(S) — 124

116

LIDAR SUBSYSTEM 108

LIDAR COMPONENT 110

FIDUCIAL(S) 114

102

106

112

104

100

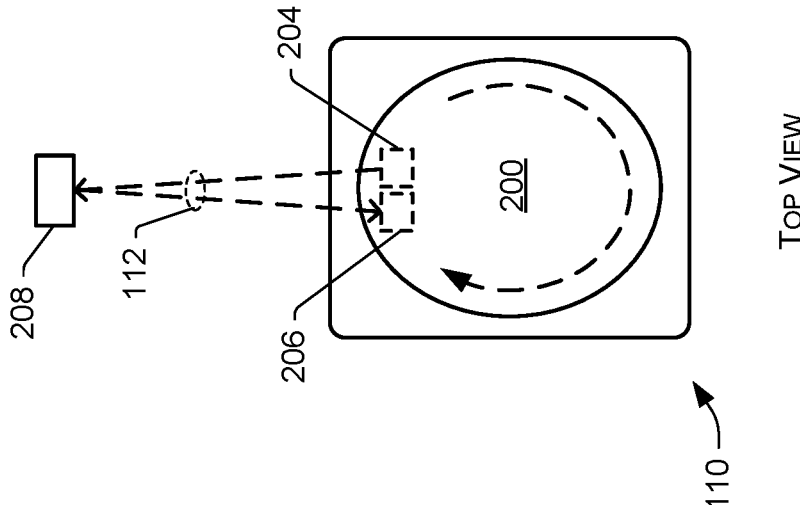
TOP VIEW
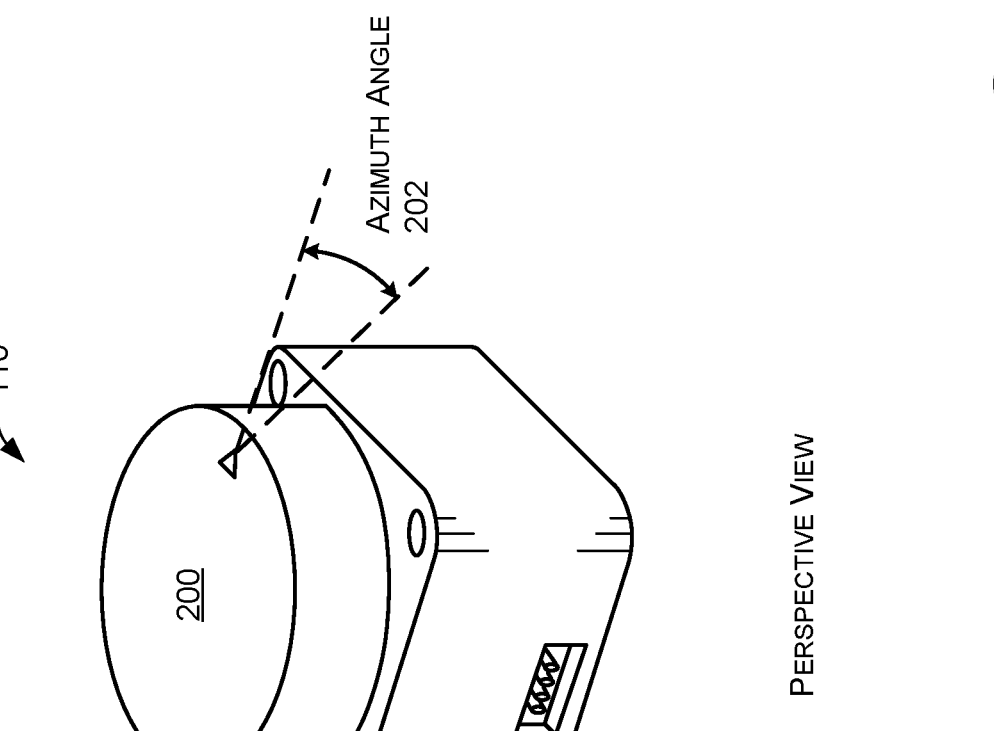
PERSPECTIVE VIEW
FIG. 2

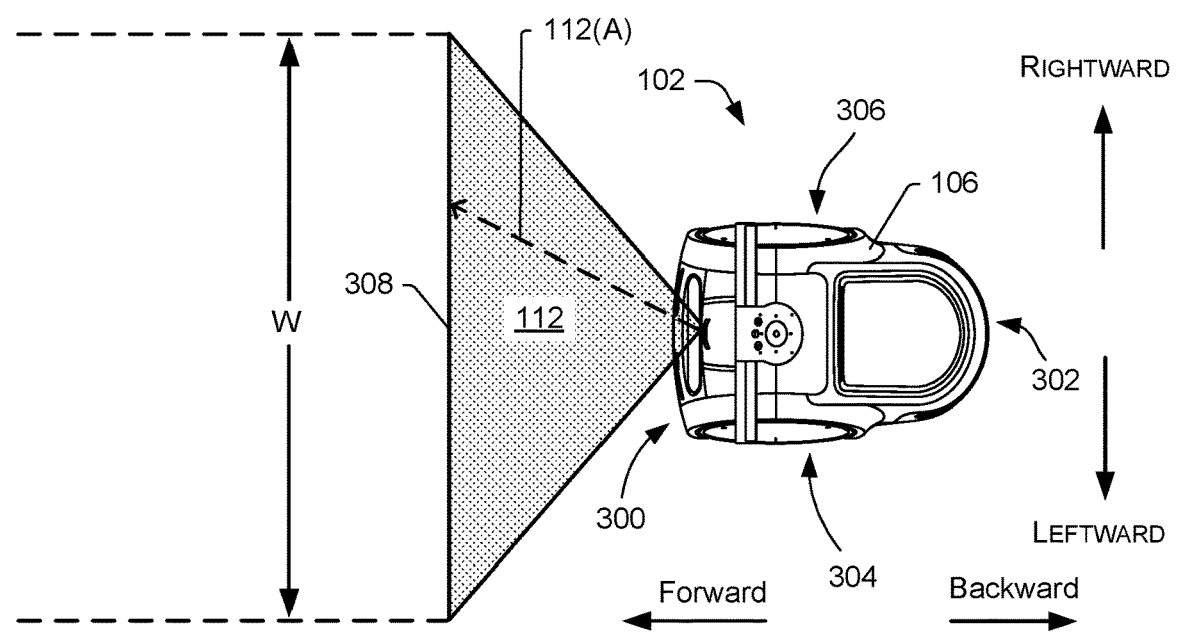
FIG. 3
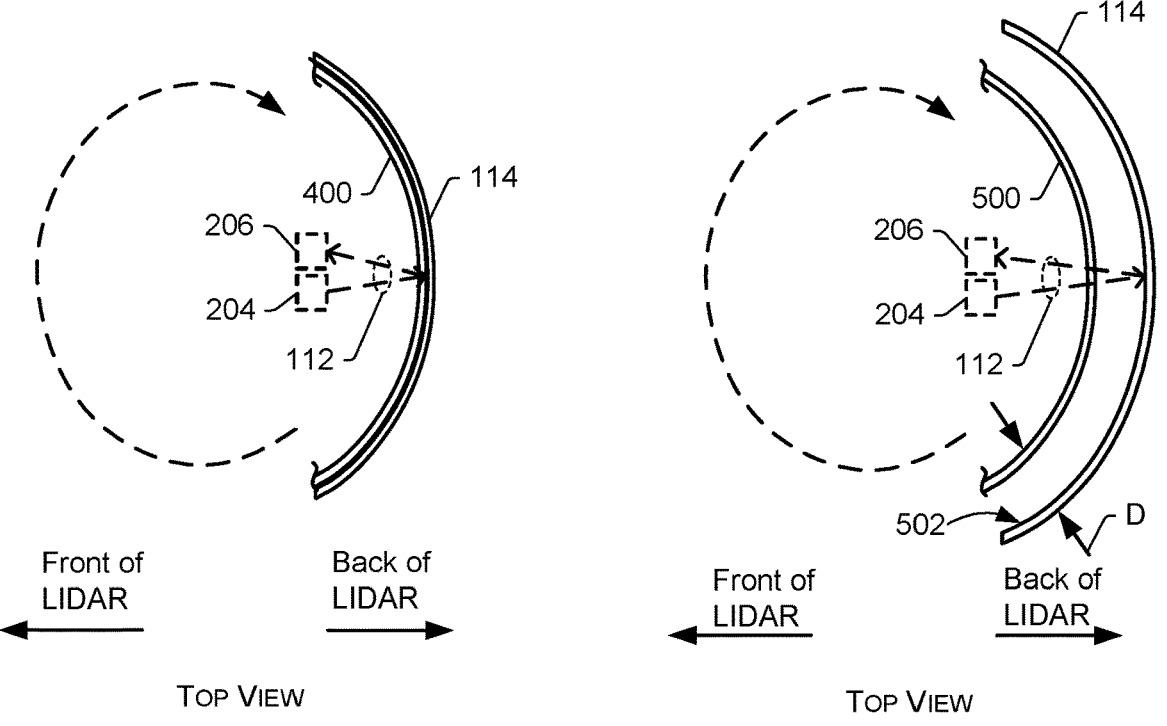
FIG. 4                    FIG. 5

PERSPECTIVE VIEW

PERSPECTIVE VIEW

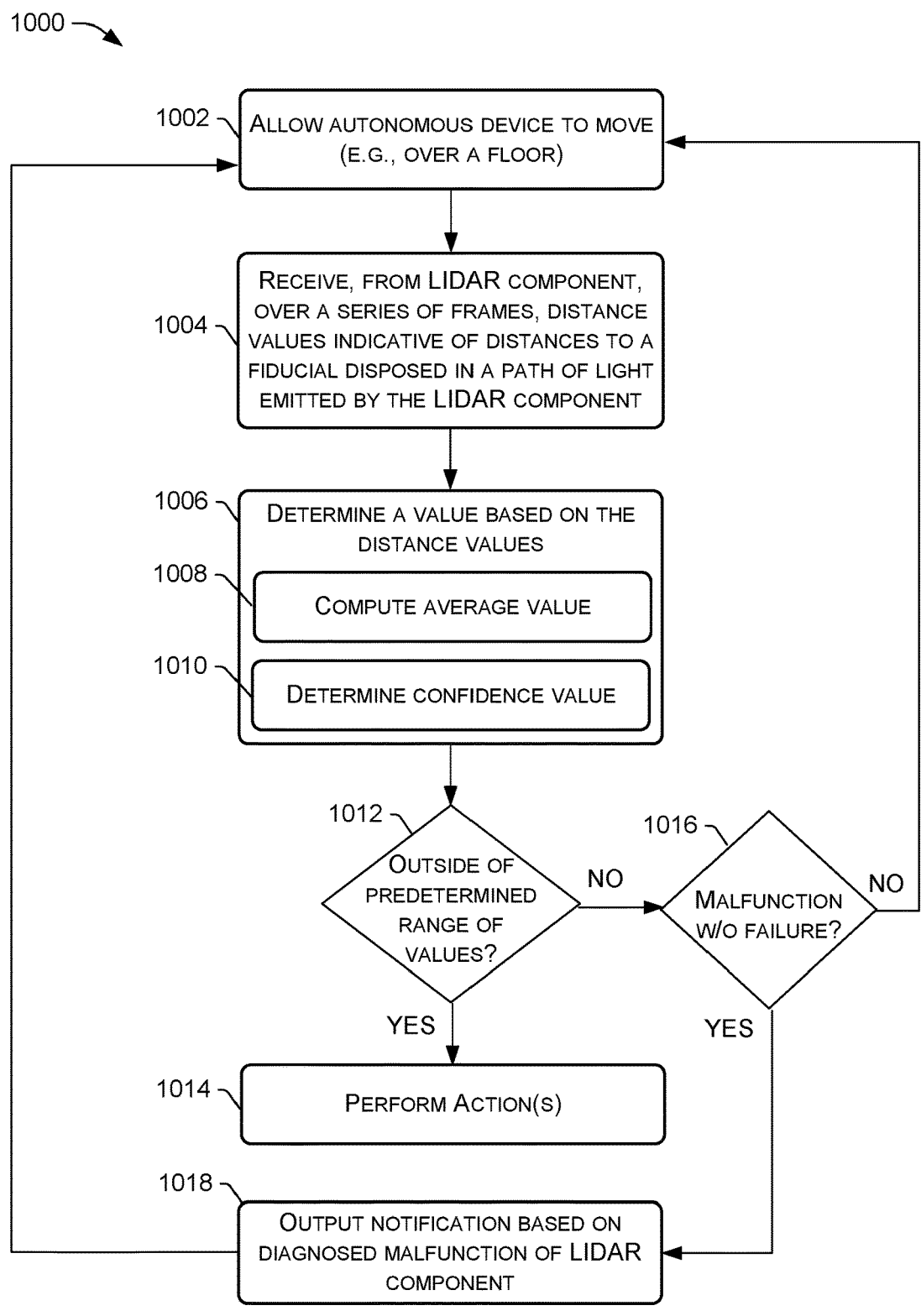

1000

1002 — ALLOW AUTONOMOUS DEVICE TO MOVE (E.G., OVER A FLOOR)

1004 — RECEIVE, FROM LIDAR COMPONENT, OVER A SERIES OF FRAMES, DISTANCE VALUES INDICATIVE OF DISTANCES TO A FIDUCIAL DISPOSED IN A PATH OF LIGHT EMITTED BY THE LIDAR COMPONENT

1006 — DETERMINE A VALUE BASED ON THE DISTANCE VALUES

1008 — COMPUTE AVERAGE VALUE

1010 — DETERMINE CONFIDENCE VALUE

1012 — OUTSIDE OF PREDETERMINED RANGE OF VALUES?

NO

1016 — MALFUNCTION W/O FAILURE?

NO

YES

YES

1014 — PERFORM ACTION(S)

1018 — OUTPUT NOTIFICATION BASED ON DIAGNOSED MALFUNCTION OF LIDAR COMPONENT

FIG. 10

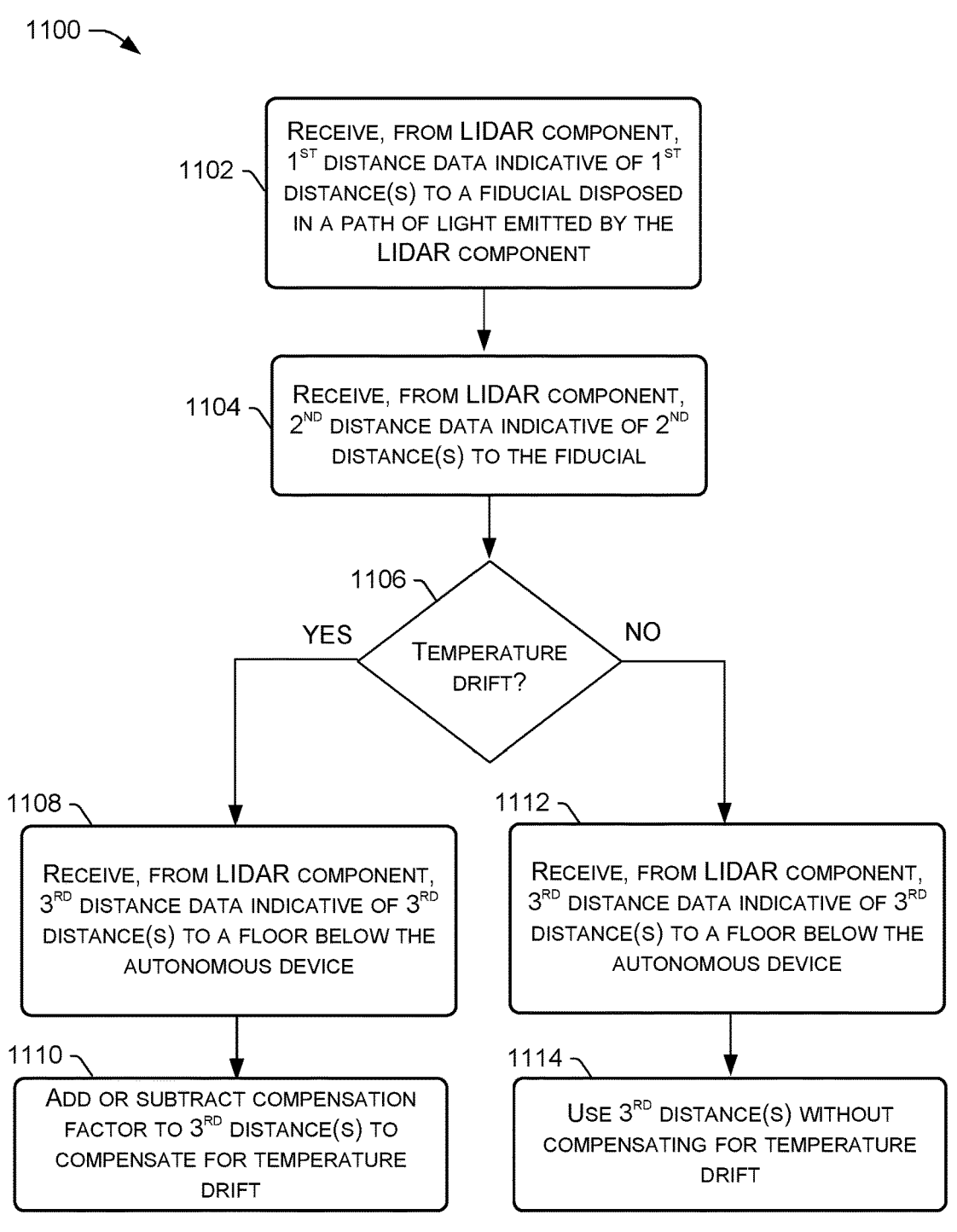

1100

1102 — RECEIVE, FROM LIDAR COMPONENT, 1ST DISTANCE DATA INDICATIVE OF 1ST DISTANCE(S) TO A FIDUCIAL DISPOSED IN A PATH OF LIGHT EMITTED BY THE LIDAR COMPONENT

1104 — RECEIVE, FROM LIDAR COMPONENT, 2ND DISTANCE DATA INDICATIVE OF 2ND DISTANCE(S) TO THE FIDUCIAL

1106 — TEMPERATURE DRIFT?

YES

NO

1108 — RECEIVE, FROM LIDAR COMPONENT, 3RD DISTANCE DATA INDICATIVE OF 3RD DISTANCE(S) TO A FLOOR BELOW THE AUTONOMOUS DEVICE

1112 — RECEIVE, FROM LIDAR COMPONENT, 3RD DISTANCE DATA INDICATIVE OF 3RD DISTANCE(S) TO A FLOOR BELOW THE AUTONOMOUS DEVICE

1110 — ADD OR SUBTRACT COMPENSATION FACTOR TO 3RD DISTANCE(S) TO COMPENSATE FOR TEMPERATURE DRIFT

1114 — USE 3RD DISTANCE(S) WITHOUT COMPENSATING FOR TEMPERATURE DRIFT

FIG. 11

FIDUCIAL-BASED LIDAR MALFUNCTION DETECTION FOR AUTONOMOUS MOTILE DEVICES

BACKGROUND

Robots are becoming increasingly popular. Some robots are capable of moving over a floor autonomously. As an autonomous robot moves, sensors of the robot can be used to detect and avoid hazards, such as obstacles (e.g., furniture, people, pets, etc.) or cliffs (e.g., steps, ledges, etc.). It can be challenging to equip consumer-grade robots with enough high-quality sensors so that the robot can move safely about an environment in more complex ways (e.g., by making sharper turns, moving at faster speeds, etc.).

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIG. 1 also illustrates a flow diagram of an example process for performing an action if a malfunction of the LIDAR component is detected using a fiducial of the LIDAR subsystem.

FIG. 2 is a diagram illustrating a perspective view and a top view of an example LIDAR component that may be part of the LIDAR subsystem included in the AMD of FIG. 1.

FIG. 3 is a diagram illustrating a top view of an example AMD including the LIDAR subsystem that is usable for floor detection.

FIG. 4 is a diagram illustrating a top view of an example fiducial disposed on a cover of a head of the LIDAR component.

FIG. 5 is a diagram illustrating a top view of an example fiducial spaced a distance from a head of the LIDAR component.

FIG. 10 is a flow diagram of an example process for detecting and/or diagnosing a malfunction of a LIDAR component using a fiducial of the LIDAR subsystem.

FIG. 11 is a flow diagram of an example process for using a fiducial to compensate for temperature drift.

DETAILED DESCRIPTION

Figure 1:
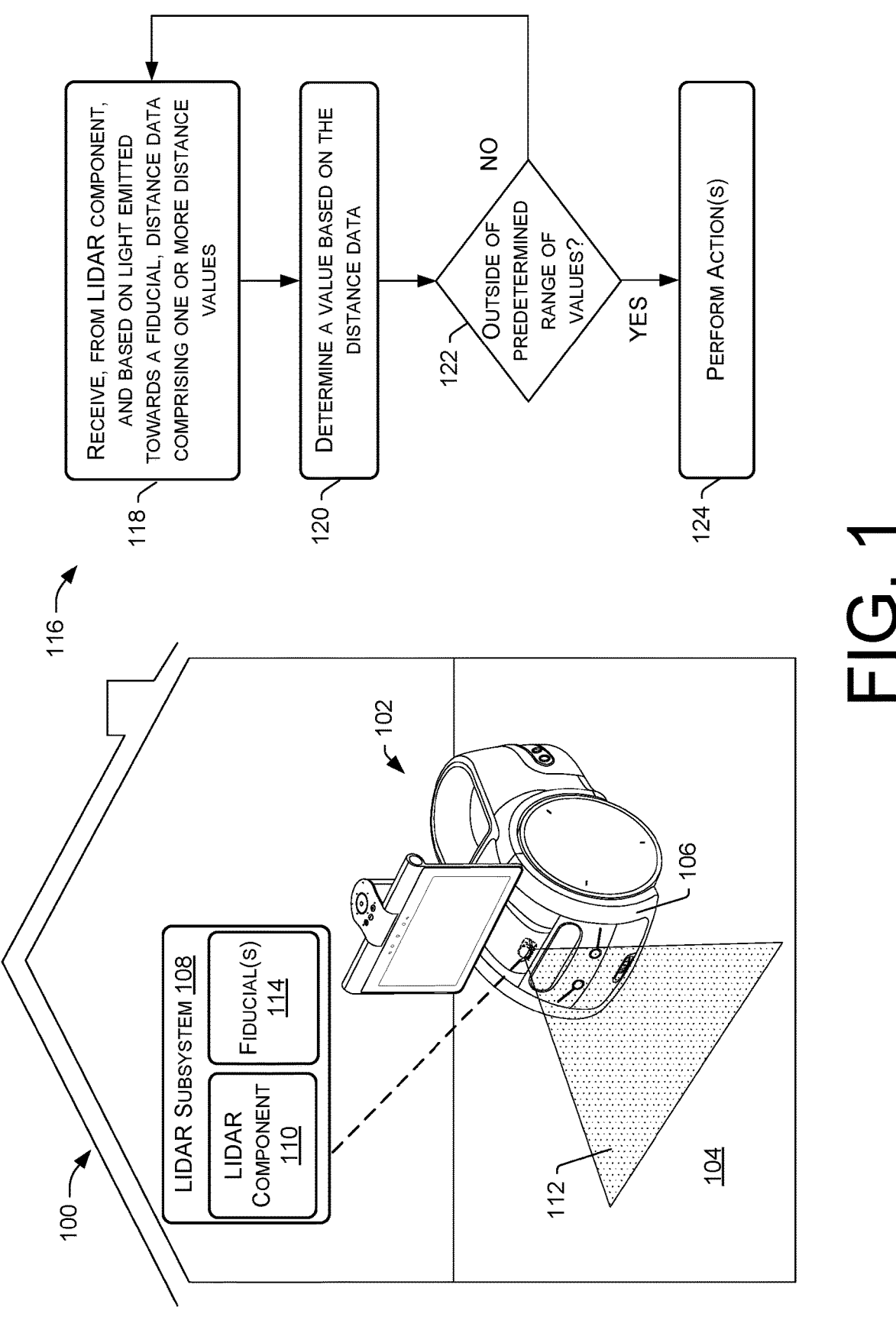
FIG. 1 illustrates an example autonomous motile device (AMD) within an example environment, the AMD including a light detection and ranging (LIDAR) subsystem.

Described herein are, among other things, techniques, devices, and systems, including an autonomous motile device (AMD) and a light detection and ranging (LIDAR) subsystem that includes a fiducial(s) for, among other things, detecting and/or diagnosing a malfunction of a LIDAR component of the LIDAR subsystem. The LIDAR component described herein is configured to emit and detect light for ranging. LIDAR refers to a remote sensing technology that emits focused beams of light (e.g., discrete pulses of laser light) and measures the time it takes for the reflections of the emitted light to be detected by a light detector. This data is then used to compute ranges, or distances, to objects. In some examples, at least some of the light emitted from the LIDAR component is directed towards the floor, and light that is returned to, and detected by, the LIDAR component allows the LIDAR component to output distance data indicative of a distance from the LIDAR component to one or more points on the floor. In this sense, topography data of the floor in the vicinity of the AMD can be obtained in real-time using the LIDAR subsystem. This topography data may be used by the mobility subsystem of the AMD (e.g., to facilitate autonomous movement over the floor, to navigate from an origin to a destination, to generate and use a map for obstacle avoidance during movement, etc.). Additionally, or alternatively, this topography data may be used by a safety subsystem of the AMD. The safety subsystem may implement one or more hazard-detection functions, such as a cliff detection function and/or an obstacle detection function. These hazard-detection functions of the safety subsystem may utilize distance data output by the LIDAR component of the LIDAR subsystem. Because the LIDAR component is used by the safety subsystem of the AMD, if the LIDAR component malfunctions during operation, the fiducial(s) of the LIDAR subsystem can be used to detect such a malfunction, which allows for appropriate action to be taken (e.g., stopping movement of the AMD) to avoid a potential hazard. The disclosed fiducial-based detection of a LIDAR malfunction also allows the AMD to comply with relevant functional safety standards.

In an illustrative example, an AMD may reside within an environment (e.g., in a home, office, hotel, facility, etc.). The AMD is configured to move autonomously through a space within the environment using output devices and a mobility subsystem to enable and control the movement of the AMD. For example, the AMD may be a self-powered, robot with motorized wheels and/or legs configured to propel and/or rotate the AMD in any direction and at various speeds and accelerations.

The AMD may use various sensors for various purposes. As mentioned, one of those sensors may be a LIDAR component that is used to determine distance information with respect to one or more points in the environment, such as one or more points on the floor. In some examples, the LIDAR component is a two-dimensional (2D) LIDAR sensor (sometimes referred to herein as a "spinning LIDAR sensor," a "planar, spinning LIDAR sensor," or a "horizontal, spinning LIDAR sensor"). A 2D LIDAR sensor includes a light emitter and a light detector that are configured to rotate (or spin) in a clockwise or counterclockwise direction over a 360 degree azimuth angle range while emitting pulsed laser light and detecting reflected light pulses. This allows the LIDAR component to output distance data (e.g., distances to target points at a particular azimuth angle(s)). In some examples, the distance data can be provided by the LIDAR component as, and/or the distance data can be processed downstream to generate, a 2D point cloud (e.g., a 2D "slice") of the environment surrounding the LIDAR component. Further, at least a portion of the light emitted by the LIDAR component may be directed towards the floor below the AMD, as described herein, rather than all of the light being emitted in a plane that is parallel to the floor. In this manner, the distance data output by the LIDAR component within a particular azimuth angle range(s) may correspond to points on a line(s) along the floor (e.g., a line(s) in front of the AMD). Such "lines" projected on the floor are sometimes referred to herein as "scan lines" or "detection lines." The safety subsystem can use the distance data corresponding to these scan lines to determine whether the AMD is approaching a hazard, such as a cliff or an obstacle. For example, a distance(s) to a point(s) on the floor that is/are obtained by the LIDAR component can be compared to one or more thresholds to determine if the AMD is near (e.g., approaching) a cliff or an obstacle using one or more criteria with respect to the threshold. In this manner, the AMD can perform an action (e.g., stop moving) if a cliff or an obstacle is detected using the LIDAR subsystem.

In order to ensure that the AMD is using a functional LIDAR component that is providing reliable distance data, the AMD and/or the safety subsystem thereof may utilize a fiducial(s) to detect and/or diagnose a malfunction of the LIDAR component. For example, the fiducial(s) may be disposed in a path of light that is to be emitted by the LIDAR component, and at least some of the distance data output from the LIDAR component within a particular azimuth angle range(s) associated with the fiducial(s) may, therefore, correspond to one or more points on the fiducial(s). In addition, a predetermined range of values can be defined for a fiducial, and this predetermined value range provides a reference, ground truth, and/or a basis of comparison for the safety subsystem to determine whether the LIDAR component is functioning properly, or, in the alternative, whether the LIDAR component has malfunctioned. For example, during operation of the LIDAR subsystem, a processor(s) (e.g., a processor of the AMD) may receive, from the LIDAR component, and based at least in part on light emitted by the LIDAR component towards the fiducial, distance data including one or more distance values, and the processor(s) may determine a value based at least in part on the distance data. This value can be compared to the predetermined range of values defined for the fiducial(s), and, if the value is outside of the predetermined range of values, the processor(s) may cause the AMD to perform an action(s).

The action(s) performed by the AMD in response to detecting a malfunction of the LIDAR component can be a preventative action(s) (e.g., causing the AMD to stop moving). Additionally, or alternatively, the action(s) can include outputting a notification (e.g., a notification to perform preventative maintenance on the LIDAR component). Such a notification may be output if the LIDAR component has malfunctioned but is still operable within safety limits. Thus, the fiducial can function as a high-confidence target to the LIDAR component so that the distance data (e.g., distance readings) output by the LIDAR component can be monitored to determine whether and when something goes wrong with the LIDAR component. In this manner, a fiducial-based malfunction detection and diagnostics function is provided to ensure that the AMD operates safely, such as by taking appropriate action(s) if a malfunction of the LIDAR component is detected. The disclosed fiducial-based malfunction detection and diagnostics function can be particularly useful for AMDs that use LIDAR components without built-in redundancy for a diagnostic function of the LIDAR component. This may be the case for consumer-grade LIDAR components. In other words, the fiducial described herein can be provided as a component of the LIDAR subsystem that is separate from the LIDAR component (e.g., the fiducial may be external to a pre-packaged LIDAR component: the fiducial may be an add-on component). Therefore, the disclosed LIDAR subsystem can use a relatively low-cost LIDAR component for a safety subsystem by virtue of a separate fiducial that is included in the LIDAR subsystem.

FIG. 1 illustrates an example environment 100 and an example autonomous motile device (AMD) 102 within the environment 100. The environment 100 in which the AMD 102 is located may be a home or other premises (e.g., an office, a hotel, a facility, etc.), or any similar environment. Such an environment 100 may include a floor 104, which may be a human-made floor, such as a floor 104 made of wood, concrete, carpet, or the like. In some examples, the floor 104 in the environment 100 may be the ground of the Earth itself (natural terrain), such as dirt, gravel, sand, grass, or the like. FIG. 1 depicts an example environment 100 in the form of a house, which includes a human-made floor 104 that is substantially planar (flat). Other objects and/or features may exist within, and/or move about, the environment 100, such as walls, furniture, people, pets, other AMDs, or the like. In addition, people and/or pets may periodically move inanimate objects (e.g., toys, clothes, etc.) about the environment 100, thereby changing the environment 100.

FIG. 1 depicts the AMD 102 in the form of a robot. It is to be appreciated, however, that the AMD 102 described herein is not limited to a robot, such as the robot depicted in FIG. 1, or even a land vehicle. For example, the AMD 102 may be an unmanned aerial vehicle (UAV) (e.g., a "drone"), an amphibious vehicle, an underwater vehicle, etc. Additionally, or alternatively, the AMD 102 can include wheels, legs, tracks, and/or other output devices/mechanisms to move (e.g., propel, turn, etc.) about the environment 100. Example AMDs 102 include, without limitation, robots, industrial robots, automotive robots, surveillance robots, and the like. The terms "AMD," "autonomous vehicle," "autonomous mobile device," "autonomous electronic device," "autonomous robot," "mobile robot," "home robot," and "robot" may be used interchangeably herein to describe any suitable type of AMD, such as the AMD 102, that is configured to perform one or more tasks autonomously, such as moving about an environment (or a space), such as the environment 100. In some examples, the AMD 102 may include other functionality in addition to autonomous movement. For example, the AMD 102 may function as a speech interface device that is configured to process speech (e.g., spoken utterances from people in the environment 100). Additionally, or alternatively, the environment 100 may include one or more secondary devices (e.g., Internet of Things (IoT) devices and/or smart home devices like thermostats, lights, refrigerators, ovens, etc.) that may be controllable by the AMD 102. Accordingly, the AMD 102, in some examples, may be network-enabled (e.g., wireless) and configured to connect to a remote system and/or to one or more secondary devices in the environment 100, such as by connecting to a network (e.g., the Internet, a wireless local area network (WLAN), a cellular network, etc.) and/or by using a short-range wireless protocol, like Bluetooth®, Zigbee R, etc.

As shown in FIG. 1, the AMD 102 may include a body 106. The body 106 may provide structure to the AMD 102. For example, the body 106 may be, or include, a frame, a housing, compartments, and the like. In some examples, the body 106 can be a unitary piece of material (e.g., an injection molded, monolithic body), while in other examples the body 106 may be, or include, an assembly of various parts and components, such as mechanical components, electrical components, and so on. Various component parts of the body 106 may be coupled together using fasteners (e.g., screws, bolts, pins, etc.), adhesive (e.g., glue, tape), and/or various component parts may be press fit or snap fit together. It is to be appreciated that some parts of the AMD 102 may be external to the body 106, the outer boundary of the body 106 defined by a housing, and that other parts of the AMD 102 may be internal to the body 106 (e.g., disposed within the housing). The body 106, or portions thereof, may be made of any suitable material or combination of materials including, without limitation, metal, plastic, rubber, glass, etc. Furthermore, the form factor of the AMD 102 may vary depending on the application. In the example of FIG. 1, the AMD 102 may be about the size of a small dog (e.g., about 420 millimeters (mm) in length, about 250 mm in width, and about 440 mm in length). It is to be appreciated, however, that the techniques, devices, and systems described herein can be implemented in larger or smaller form factors of AMDs.

As shown in FIG. 1, the AMD 102 may further include a LIDAR subsystem 108 that is utilized, at least in part, for floor detection (e.g., to determine distance information to one or more points on the floor 104). The LIDAR subsystem 108 may include at least a LIDAR component 110, such as a LIDAR sensor, that is coupled to (e.g., mounted to, in, or on) the body 106 of the AMD 102. For example, the LIDAR component 110 can be mounted onto a platform within the body 106 (e.g., using fasteners, adhesive, press fit or snap fit parts, etc.), the platform being a part of the body 106 that supports the LIDAR component 110. In some examples, all or a portion of the LIDAR component 110 may be disposed within (or internal to) the body 106. Accordingly, at least some of the LIDAR component 110 may be hidden from view when looking at the AMD 102 from an external point of view, except that a small portion of the LIDAR component 110 may be visible through a light-transmissive (e.g., transparent) window(s) and/or an aperture(s) (e.g., a slot) defined in the body 106. The LIDAR subsystem 108 is shown as being positioned at a front side of the AMD 102 (or body 106). The "front" (or "front side") of the AMD 102 may be a side of the AMD 102 facing the forward direction of travel in which the AMD 102 is configured to move.

The LIDAR component 110 is configured to emit light 112, and to detect at least a portion of the light 112 that is returned from (e.g., reflected by) objects in the environment 100. Based on the light that is returned to, and detected by, the LIDAR component 110, the LIDAR component 110 can output distance data indicative of a distance(s) (or range(s)) from the LIDAR component 110 to one or more points in the environment 100. In some examples, these points are on the floor 104 below the AMD 102 because the light 112 is directed towards the floor 104, as depicted in FIG. 1. The LIDAR subsystem 108 provides the AMD 102 with various "floor-detecting" LIDAR capabilities to improve the mobility and/or the safety of the AMD 102, such as by allowing the AMD 102 to make a sharp turn and/or move at a top speed with reduced risk of a hazard (e.g., driving over a cliff, colliding with an object, etc.). For example, the LIDAR subsystem 108 described herein may help the AMD 102 detect a cliff, such as a staircase.

The LIDAR subsystem 108 may further include a fiducial(s) 114, various implementations of which are described in more detail below. In general, the fiducial(s) 114 of the LIDAR subsystem 108 can be used to detect a malfunction of the LIDAR component 110 so that appropriate action can be taken to avoid a potential hazard. In some examples, the fiducial(s) 114 allows for detecting and/or diagnosing a malfunction of the LIDAR component 110. The fiducial(s) 114 may be disposed in a path of light 112 that is to be emitted by the LIDAR component 110. For example, the fiducial(s) 114 may be disposed behind the LIDAR component 110 within the body 106 of the AMD 102. However, because the LIDAR component 110 can be positioned at any suitable location (e.g., at any side of the AMD 102, including a right side, a left side, a back side, a top side, a bottom side, or a corner), the fiducial(s) 114, in some examples, may be disposed beside, in front of, behind, above, and/or below the LIDAR component 110, depending on the position of the LIDAR component 110. The fiducial (s) 114 can be coupled to the LIDAR component 110 itself or to the body of the AMD 102. In either case, at least some of the distance data output from the LIDAR component 110 within a particular azimuth angle range(s) associated with the fiducial 114 may correspond to one or more points on the fiducial(s) 114. In addition, a predetermined range of values can be defined for the fiducial(s) 114, and this predetermined value range provides a reference, ground truth, and/or a basis of comparison for the safety subsystem of the AMD 102 to determine whether the LIDAR component 110 is functioning properly, or, in the alternative, whether the LIDAR component 110 has malfunctioned. Such a predetermined value range can be determined at a time of manufacture of the AMD 102 including the LIDAR component 110. That is, distance data associated with the fiducial(s) 114 may be received from the LIDAR component 110 while the AMD 102 is being manufactured (e.g., built, tested, etc.), and the predetermined range of values can be defined for the fiducial(s) 114 based at least in part on the distance data received during manufacture. In some examples, the predetermined range of values may be defined for the fiducial(s) 114 by plotting the statistical distribution of the distance readings and/or the confidence readings obtained by the LIDAR component 110 with respect to the fiducial(s) 114, and determining the mean and the sigma. For example, the predetermined range of values may be defined as the range of values corresponding to five sigma on the statistical distribution. This way, the predetermined range of values accounts for noise in the distance readings with respect to the fiducial(s) 114. In other words, different types of fiducials 114 may have different predetermined ranges of values defined for them. FIG. 1 illustrates a flow diagram of an example process 116 for performing an action if a malfunction of the LIDAR component 110 is detected using the fiducial(s) 114 of the LIDAR subsystem 108.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 118, a processor(s) (e.g., a processor of the AMD 102) may execute computer-executable instructions to receive, from the LIDAR component 110, and based at least in part on light 112 emitted by the LIDAR component 110 towards the fiducial, distance data comprising one or more distance values. The distance value(s) included in the distance data may be indicative of one or more distances between the LIDAR component 110 and one or more points on the fiducial(s) 114. For example, as a light emitter and a light detector of the LIDAR component 110 rotate over a particular azimuth angle range associated with the fiducial 114, the light emitter is configured to emit pulsed laser light 112 towards the fiducial 114, and the light detector is configured to detect the reflected pulses of light 112 reflected from the fiducial 114. The distance data provided by the LIDAR component 110 over this particular azimuth angle range may be based at least in part on a time between the emission of a pulse of light 112 to the detection of the reflected pulse of light 112. For example, a measured time value for an individual pulse may be converted into a digitized value (or distance reading, sometimes referred to herein as a "distance value," or a "range value"). Because the light emitter and the light detector of the LIDAR component 110 are rotating at a particular frequency and emitting a series of light pulses during rotation, the distance data may be received at block 118 as a series of values (or distance readings). In some examples, the distance data is received at block 118 during motion of the AMD 102 (e.g., while the AMD 102 is moving over the floor 104).

At 120, the processor(s) may determine a value based at least in part on the distance data received at block 118. In some examples, this value can be a single distance value (or distance reading). In some examples, the value can be a statistic that is computed based on a plurality of distance values (or distance readings), such as an average of a plurality of distance values received at block 118. In some examples, the value can be a confidence value associated with the distance data received at block 118. That is, the LIDAR component 110 may be configured to output confidence data (e.g., confidence values, or confidence readings) in addition to the distance data to indicate the confidence that the distance values are accurate. Additionally, or alternatively, a component (e.g., a chip, such as an integrated circuit (IC)) that processes the data output from the LIDAR component 110 may be configured to output confidence data (e.g., confidence values, or confidence readings). Accordingly, in some examples, the value determined at block 120 can be one of these confidence values (or confidence readings) associated with a corresponding distance value. In this sense, the confidence value can be determined based on the distance data by virtue of the confidence value's association with a corresponding distance value. In other examples, the value determined at block 120 can be a statistic that is computed based on a plurality of the confidence values (or confidence readings), such as an average of the confidence values. In some examples, the confidence values represent the strength (e.g., intensity, signal to noise ratio (SNR), etc.) of the return signal detected by the light detector of the LIDAR component 110, or the confidence values represent a different metric.

At 122, the processor(s) may compare the value to the predetermined range of values defined for the fiducial 114, which provides a reference, ground truth, and/or a basis of comparison for the safety subsystem of the AMD 102 to determine whether the LIDAR component 110 is functioning properly, or, in the alternative, whether the LIDAR component 110 has malfunctioned. "Malfunction," as used herein, may include, but is not limited to, a failure of the LIDAR component 110, where "failure" means that the LIDAR component 110 is not functioning properly, and that it may not be safe for the AMD 102 to perform certain actions (e.g., movement) using the failed LIDAR component 110. Example failure modes are discussed in more detail below.

Based on the comparison of the value to the predetermined range of values defined for the fiducial 114, the processor(s) can determine whether the value is outside of the predetermined range of values (sometimes referred to herein as "out of bounds"). If the value is within the predetermined range of values at block 122, the LIDAR component 110 may be assumed to be functioning properly, and the process 116 may follow the NO route from block 122 to block 118 where the processor(s) may receive new distance data from the LIDAR component 110 at block 118, and to determine a new value based on the new distance data at block 120. If the value is outside of the predetermined range of values at block 122 (e.g., "out of bounds"), this may be indicative of the LIDAR component 110 having malfunctioned, and the process 116 may follow the YES route from block 122 to block 124.

At 124, the processor(s) may cause the AMD 102 to perform an action(s) based at least in part on determining that the value is outside of the predetermined range of values, which is indicative of a malfunction of the LIDAR component 110. The action(s) may be an action(s) to avoid a potential hazard, such as driving over a cliff (e.g., a staircase, a ledge, etc.) or colliding with an obstacle (e.g., furniture, a person, a pet, etc.). For example, if the LIDAR component 110 is not functioning properly, the LIDAR component 110 may be outputting distance data that is unreliable, which means that the AMD 102 may be unable to timely detect a hazard, such as a cliff or an obstacle, if it were to use the malfunctioned (e.g., failed) LIDAR component 110. Accordingly, a preventative action(s) (e.g., causing the AMD 102 to stop moving, such as by applying the breaks of the AMD 102) can be performed at block 124 in order to prevent injury to people and/or pets, and/or to prevent damage to objects (e.g., furniture, decorations, etc.) in the environment 100 and/or damage to the AMD 102 itself. Other types of actions may include outputting a notification on the AMD 102 (e.g., displaying a notification to perform preventative maintenance on the LIDAR component 110, and/or a notification that the LIDAR component 110 has malfunctioned, etc.), and/or outputting an alarm (e.g., an audible sound from a speaker(s) of the AMD 102), flashing a light on the AMD 102, sending information (e.g., an alert, a warning, etc.) to a remote system over a network and/or to a user device, and the like. In some examples, performing an action(s) at block 124 may include refraining from performing an action in a particular risk category, such as refraining from moving through the environment 100 (e.g., over the floor 104). In this manner, the AMD 102 may be allowed/permitted to perform other, low-risk actions, such as speech processing, outputting reminders, surveillance of the environment 100, and the like, but the AMD 102 may be prevented from performing high-risk actions, such as movement, which depends on a functional LIDAR component 110 to provide reliable distance data.

FIG. 2 is a diagram illustrating an example LIDAR component 110 that may be part of the LIDAR subsystem 108 of the AMD 102 depicted in FIG. 1. The shape and size of the LIDAR component 110 depicted in FIG. 2 is non-limiting. For example, rather than a cylindrical head 200, the LIDAR component 110 may have a conical head, or any other suitable shape. As another example, rather than a cuboidal base, the LIDAR component 110 may have a cylindrical base, or any other suitable shape. In addition, although the LIDAR component 200 depicted in FIG. 2 is a pre-packaged LIDAR component 110, it is to be appreciated that implementations of the LIDAR component 200 can include component parts thereof, which are not pre-packaged before being integrated into the body 106 of the AMD 102. Furthermore, the example LIDAR component 110 depicted in FIG. 2 is an example of a 2D LIDAR sensor, although the LIDAR component 110 is not limited to a 2D LIDAR sensor. For example, the LIDAR component 110 can be a three-dimensional (3D) LIDAR sensor (sometimes referred to herein as a "semiconductor LIDAR sensor," or a "solid state LIDAR sensor"). In the 2D LIDAR sensor example, a head 200 of the LIDAR component 110 includes a light emitter 204 and a light detector 206 that may be disposed within a cover (e.g., a stationary cover, such as cover glass). The light emitter 204 and the light detector 206 are configured to rotate (or spin) in a clockwise or counter-clockwise direction about the Z-axis shown in FIG. 2, and to rotate over a 360 degree azimuth angle range. An example azimuth angle 202 is depicted in FIG. 2. The terminology "azimuth angle" 202 is used herein to describe the manner in which the light emitter 204 and the light detector 206 (e.g., within the head 200) are configured to rotate, from the perspective of an observer in a spherical coordinate system that is positioned at a center of the head 200. While the light emitter 204 and the light detector 206 are rotating, the light emitter 204 (or light source (e.g., a laser), transmitter (Tx), etc.) is configured to emit pulsed laser light 112, and the light detector 206 (e.g., a light sensor, optical sensor, receiver (Rx), etc.) is configured to detect the reflected pulses of light 112. The light emitter 204 and the light detector 206 may rotate at any suitable frequency (or "frame rate", "scan rate", etc.), such as a frequency within a range of about 0.1 to 1000 hertz (Hz). In some examples, the light emitter 204 and the light detector 206 of the LIDAR component 110 may be configured to rotate at a frequency within a range of about 1 to 50 Hz. The light emitter 204 may be configured to emit the light 112 at any suitable wavelength(s) of the electromagnetic spectrum including, without limitation, infrared (IR) light, near-IR light, far-IR light, mid-IR light, visible light, ultraviolet (UV) light, or the like. In some examples, the light emitter 204 may be configured to emit light at a wavelength within a range of about 100 nanometers (nm) to about 10 micrometer (μm), or possibly a narrower range of 850 nm to 950 nm, depending on the application. The light emitter 204 and light detector 206 may be used to obtain range measurements at particular azimuth angles 202 over a full revolution of the light emitter 204 and the light detector 206, where one full revolution over a 360 degree azimuth angle 202 range corresponds to one "frame" or one "scan."

As the AMD 102 may be used in a variety of different applications, the specifications of the LIDAR component 110 may vary depending on the application. An individual range measurement may be taken by emitting a light pulse from the light emitter 204 to a surrounding environment, detecting a portion of the light pulse that is reflected from an object 208 in the surrounding environment, and computing distance data based on the reflected portion of the light pulse (e.g., based on an amount of time between emission of the light pulse and detection of the light pulse). This allows the LIDAR component 110 to output distance data (e.g., a distance(s) to target points at a particular azimuth angle(s) 202). For example, if light pulses are emitted at integer azimuth angles 202 (e.g., zero degrees, one degree, two degrees, etc.), 360 distance measurements may be obtained in a single frame. In some examples, the distance data can be provided in the form of a 2D point cloud (e.g., a 2D "slice") of the environment surrounding the LIDAR component 110. In some examples, as the AMD 102 moves through an environment 100 (e.g., over a floor 104), a densely-spaced network of points on the floor 104 can be generated by combining these 2D point clouds into an aggregate point cloud, which can be used to generate a 3D representation of the surface of the floor 104 (and/or objects that are on or slightly above the floor 104 within the field of view of the LIDAR component 110). In an example where the LIDAR component 110 is a 3D LIDAR sensor, the distance data can be provided in the form of a 3D point cloud. In this sense, topography data of the floor 104 can be obtained and stored for a period of time in memory of the AMD 102 and/or sent to, and stored by, a remote system.

FIG. 3 is a diagram illustrating a top view of an example AMD 102 including the LIDAR subsystem 108 that is usable for floor detection. It is to be appreciated that the shape of the body 106 of the AMD 102 can vary. For example, the body 106 may be a simple shape (e.g., a cuboid, a sphere, etc.), or the body 106 may be a more complex shape with various contours and other features (e.g., the body 106 shown in FIGS. 1 and 3). Regardless of the shape, the body 106 of the AMD 102 can be generally classified into sides of a cuboidal envelope that surrounds the body 106. In this manner, the AMD 102 (or the body 106 thereof) may have a front side 300, a back side 302, a left side 304, and a right side 306, as well as a top and a bottom, the bottom being closer to the floor 104, and the top being farther from the floor 104.

As illustrated in FIG. 3, a forward direction of travel in which the AMD 102 is configured to move may correspond to a direction in which the front side 300 of the AMD 102 is the leading side (e.g., the front side 300 is facing the forward direction of travel). Likewise, a backward direction of travel in which the AMD 102 is configured to move may correspond to a direction where the back side 302 of the AMD 102 is the leading side (e.g., the back side 302 is facing the backward direction of travel). In a similar manner, the AMD 102 may be configured to move in a leftward direction, a rightward direction, and/or any suitable combination of directions, such as diagonally. It is with these reference directions that the positions of component parts of the AMD 102 may be described relative to one another. For example, a first component of the AMD 102 may be described as being disposed "in front of" a second component if the first component is closer to the front side 300 of the AMD 102 than the second component. Likewise, the second component, in this example, may be described as being disposed "behind" the first component because the second component is closer to the back side 302 of the AMD 102 than the first component. Furthermore, component parts of the AMD 102 that are oriented in a "tilted" orientation may be described herein using roll, pitch, and yaw terminology, where roll rotation corresponds to rotation about the forward and backward axis shown in FIG. 3A, pitch rotation corresponds to rotation about the leftward and rightward axis shown in FIG. 3A, and yaw rotation corresponds to rotation about the upward and downward axis (e.g., an axis running into and out of the page in FIG. 3).

At least a portion of the light 112 emitted by the LIDAR component 110 may be directed towards the floor 104 below the AMD 102, the floor 104 being depicted in FIG. 1. This can be accomplished in various ways, such as by tilting the LIDAR component 110 relative to an upright orientation, and/or by positioning an optical element(s) (e.g., a mirror(s), a prism(s), a diffraction grating(s), a lens(es), etc.) in a path of the light 112 emitted by the LIDAR component 110. In this manner, the light 112 emitted by the light emitter 204 may be directed towards the floor 104 at an angle relative to the floor 104 (i.e., the light 112 is not parallel to the floor 104). The angle relative to the floor 104 at which the light 112 is directed can vary depending on how far in front of the AMD 102 the floor 104 is to be detected. In some examples, the angle relative to the floor 104 at which the light 112 is directed may depend on a stopping distance that is sufficient for the AMD 102 to stop safely and/or a speed at which the AMD 102 is to move over the floor 104. In some examples, the angle relative to the floor 104 at which the light 112 is directed can be varied dynamically, such as by operating an actuator that is coupled to the LIDAR component 110, by operating an actuator(s) that is coupled to an optical element(s) disposed in a path of the light 112 emitted by the LIDAR component 110, and/or by dynamically adjusting the wavelength of the light 112 emitted through an optical element(s).

By directing the light 112 towards the floor 104, the distance data output from the LIDAR component 110 may correspond to points on a scan line(s) that runs along the floor 104. FIG. 3 depicts an example of such a scan line 308, which is produced by the light 112 incident on the floor 104 in front of the AMD 102. The width, W, of the scan line 308 also corresponds to a particular azimuth angle 202 range over which a subset of the light pulses 112(A) are emitted by the LIDAR component 110. The safety subsystem of the AMD 102 can use the distance data provided by the LIDAR component 110 to determine whether the AMD 102 is approaching a hazard, such as a cliff or an obstacle. For example, distances obtained by the LIDAR component 110 can be compared to one or more thresholds to determine if the AMD 102 is near (e.g., approaching) a cliff (e.g., a staircase, a ledge, etc.) or an obstacle using one or more criteria with respect to the threshold. In this manner, the AMD 102 can perform an action (e.g., stop moving) if a cliff or an obstacle is detected using the LIDAR subsystem 108. In some examples, the LIDAR subsystem 108 may be configured to project multiple scan lines on the floor 104 for enhanced floor coverage.

FIG. 4 is a diagram illustrating a top view of an example fiducial 114 disposed on a cover 400 of a head 200 of the LIDAR component 110. It is to be appreciated that a portion, but not all, of the cover 400 is depicted in FIG. 4. This portion of the cover 400 depicted in FIG. 4 may represent a rear portion of the cover 400 where light emitted 112 by the light emitter 204 is used for determining a distance to the fiducial 114 as opposed to determining a distance to the floor 104. Accordingly, the fiducial 114 may be disposed on a back side of the LIDAR component 110, where the front side of the LIDAR component 110 is used for emission of light 112 towards the floor 104 for floor detection (as depicted in FIG. 3). Without the fiducial 114, the light 112 emitted behind the LIDAR component 110 may be directed towards the inside of the body 106 of the AMD 102. In cases where this "backwards-directed" light 112 is not otherwise used for ranging, the light 112 can be used for the disclosed detection and/or diagnostics of a malfunction of the LIDAR component 110. It is to be appreciated that the cover 400 may be a stationary cover, such as cover glass, within which light emitter 204 and the light detector 206 rotate. The cover 400 may be light transmissive in the sense that substantially all of the light 112 travels through the cover 400. For example, if the light 112 represents IR light, the cover 400 may be made of IR-transmissive cover glass. In the example of FIG. 4, the fiducial 114 is coupled to the LIDAR component 110 by the fiducial 114 being disposed on the cover 400 with no space between the cover 400 (or the head 200) of the LIDAR component 110 and the fiducial 114. In other words, a front surface of the fiducial 114 is touching (or in contact with) the cover 400 (or the head 200) of the LIDAR component 110. In some examples, the fiducial 114 is adhered to the cover 400 (or the head 200) with an adhesive. For example, the fiducial 114 may be in the form of a piece of tape, a sticker, or the like.

FIG. 5 is a diagram illustrating a top view of an example fiducial 114 that is spaced a distance, D, from a cover 500 of a head 200 of the LIDAR component 110. It is to be appreciated that a portion, but not all, of the cover 500 is depicted in FIG. 5. The cover 500 depicted in FIG. 5 may be the same as, or similar to, the cover 400. For example, the portion of the cover 500 depicted in FIG. 5 may represent a rear portion of the cover 500 where light emitted 112 by the light emitter 204 is used for determining a distance to the fiducial 114 as opposed determining a distance to the floor 104, the cover 500 may be a stationary cover, such as cover glass, and the cover 500 may be light-transmissive. In the example of FIG. 5, the fiducial 114 is spaced a distance, D, from the cover 500 (or the head 200) of the LIDAR component 110. In other words, a front surface 502 of the fiducial 114 is not touching (or not in contact with) the cover 500 (or the head 200) of the LIDAR component 110.

Figure 6:
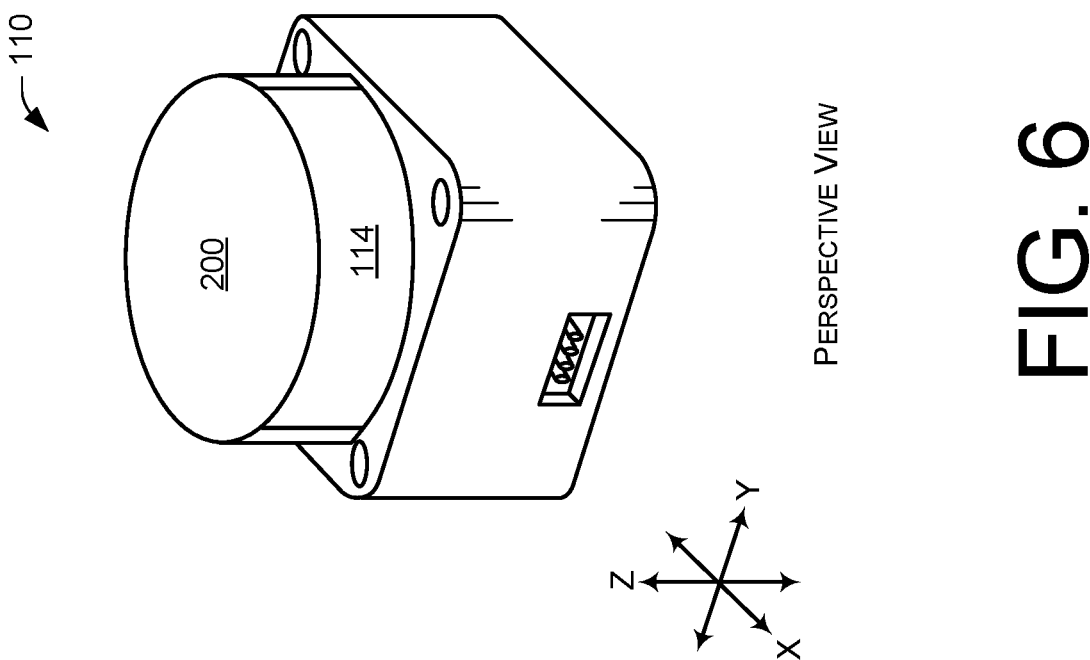
FIG. 6 is a diagram illustrating a perspective view of an example fiducial disposed on a cover of a head of the LIDAR component.

FIG. 6 is a diagram illustrating a perspective view of an example fiducial 114 disposed on a cover of a head 200 of the LIDAR component 110. This example fiducial 114 may correspond to the fiducial 114 depicted in FIG. 4 (top view). That is, the fiducial 114 depicted in FIG. 6 is coupled to the LIDAR component 110 by the fiducial 114 being disposed on the cover (e.g., the cover 400) with no space between the cover 400 (or the head 200) of the LIDAR component 110 and the fiducial 114. In other words, a front surface of the fiducial 114 is touching (or in contact with) the cover 400 (or the head 200) of the LIDAR component 110 in FIG. 6. In some examples, the fiducial 114 depicted in FIG. 6 is adhered to the cover 400 (or the head 200) with an adhesive. For example, the fiducial 114 may be in the form of a piece of tape, a sticker, or the like.

Figure 7:
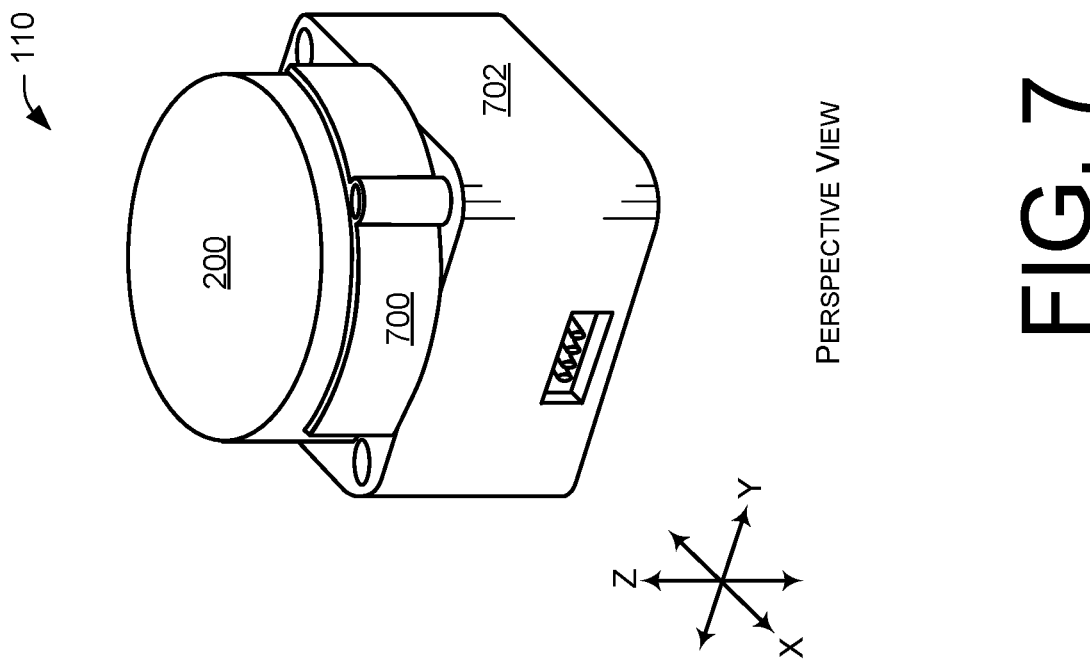
FIG. 7 is a diagram illustrating a perspective view of an example target coupled to a base, and spaced a distance from a head, of the LIDAR component, wherein a front surface of the target includes a fiducial.

FIG. 7 is a diagram illustrating a perspective view of an example target 700 coupled to a base 702 of the LIDAR component 110, the target 700 being spaced a distance from a head 200 (or the cover 500) of the LIDAR component 110. In the example of FIG. 7, a front surface (e.g., front surface 502) of the target 700 includes a fiducial 114 (not shown in FIG. 7), as described herein. The target 700 depicted in FIG. 7 may be coupled to the base 702 of the LIDAR component 110 in any suitable manner, such as by using a fastener(s) (e.g., a screw(s), a nut(s), a pin(s), etc.), adhesive, or the like, and/or the target 700 may be coupled to the base 702 at any suitable location on the base 702. The example of FIG. 7 shows the target 700 coupled to a top side of the base 702, but the target 700 can, additionally or alternatively, be coupled to a lateral side(s) of the base 702 in any suitable manner. The target 700 may extend above a top side of the base 702 so that the fiducial 114 on the front surface of the target 700 is disposed in a path of light 112 that is to be emitted by the LIDAR component 110 over a particular azimuth angle 202 range. For example, the fiducial 114 depicted in FIG. 5 (top view) may be disposed on the front surface of the target 700 depicted in FIG. 7. In this sense, the fiducial 114 may be disposed behind the head 200 (or the cover 500) of the LIDAR component 110. That is, the example target 700 depicted in FIG. 7 may include a fiducial 114 on its front surface that is spaced a distance, D, from a cover (e.g., the cover 500) of the head 200 of the LIDAR component 110. In other words, a front surface of the target 700, and, hence, a front surface 502 of the fiducial 114 disposed thereon, is not touching (or not in contact with) the cover 500 (or the head 200) of the LIDAR component 110.

Figure 8:
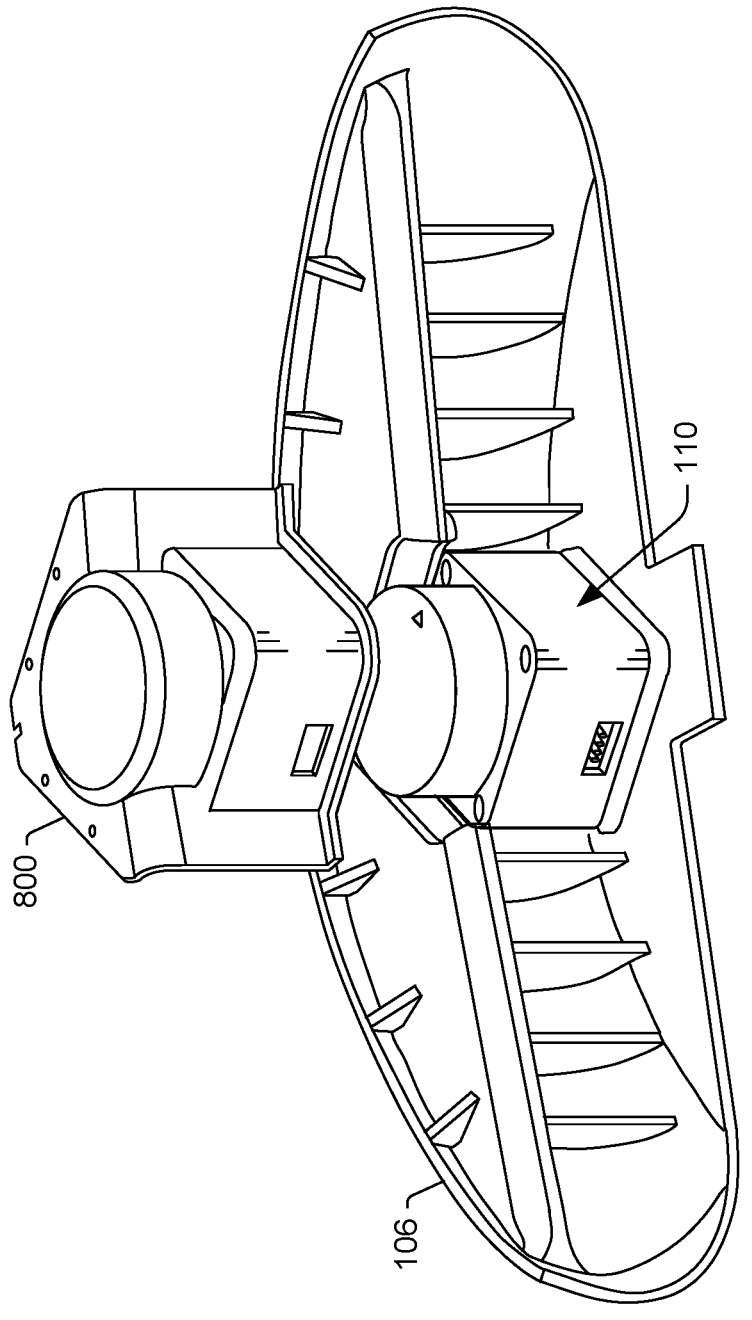
FIG. 8 illustrates a rear perspective view of the LIDAR component of the AMD from inside a body of the AMD, as well as a rear cover that is configured to be disposed behind the LIDAR component, wherein a front surface of the rear cover includes a fiducial.

FIG. 8 illustrates a rear perspective view of the LIDAR component 110 of the AMD 102 from inside a body 106 of the AMD 102, as well as a rear cover 800 (sometimes referred to herein as a "rear LIDAR cover" or a "protective cover"), which is configured to be disposed behind the LIDAR component 110. A front surface of the rear cover 800 includes a fiducial 114 (not shown in FIG. 8). The rear cover 800 can be made of any suitable material, such as rubber, silicone, or the like. The rear cover 800 is shown in FIG. 8 exploded from the remainder of the assembly to better illustrate the LIDAR component 110, which would be occluded by the rear cover 800 if the rear cover 800 were shown as being coupled to the body 106 of the AMD 102 and disposed behind the LIDAR component 110. The rear cover 800 may, in part, protect the LIDAR component 110 from damage (e.g., to seal the LIDAR component 110 and to protect the LIDAR component 110 from dust, water/moisture, debris, etc.). In addition, the rear cover 800 can provide a structure on which the fiducial 114 can be disposed behind the LIDAR component 110. In this sense, the rear cover 800 can have dual functionality, in some examples. In other examples, the fiducial 114 can be disposed on the cover 400 of the head 200 of the LIDAR component 110 (e.g., as depicted in FIG. 6) or the fiducial 114 can be disposed on a front surface of the target 700 (e.g., the target 700 depicted in FIG. 7), and, in these examples, the fiducial 114 is disposed between the LIDAR component 110 and the rear cover 800, or the rear cover 800 may be omitted from the assembly.

The fiducials 114 described herein may be made of a material that is reflective such that light 112 emitted by the light emitter 204 is reflected by the fiducial 114 as reflected light, which may be detected by the light detector 206. The level of reflectivity (sometimes referred to herein in terms of "reflectance," "absorptance," or "transmittance,") of the fiducial 114 can vary, depending on the application. Furthermore, as described in more detail below with respect to FIG. 9, the fiducial 114 can have variable levels of reflectivity in either a horizontal direction along the fiducial 114, a vertical direction along the fiducial 114, a diagonal direction along the fiducial 114, or a combination thereof. That is, the fiducial 114 can be partitioned into multiple sections, where a first section has a first reflectivity, and a second section has a second reflectivity different than the first reflectivity. A fiducial 114 partitioned into sections of varying reflectivity can provide coverage over the dynamic range of the light emitter 204 (e.g., a laser), because the intensity of the light 112 emitted by the light emitter 204 can vary, sometimes by 2× or 3×, between a minimum light intensity and a maximum light intensity. Such a fiducial 114 having variable reflectivity can also allow for enhanced detection and/or diagnostics functions with respect to a malfunction of the LIDAR component 110.

Figure 9:
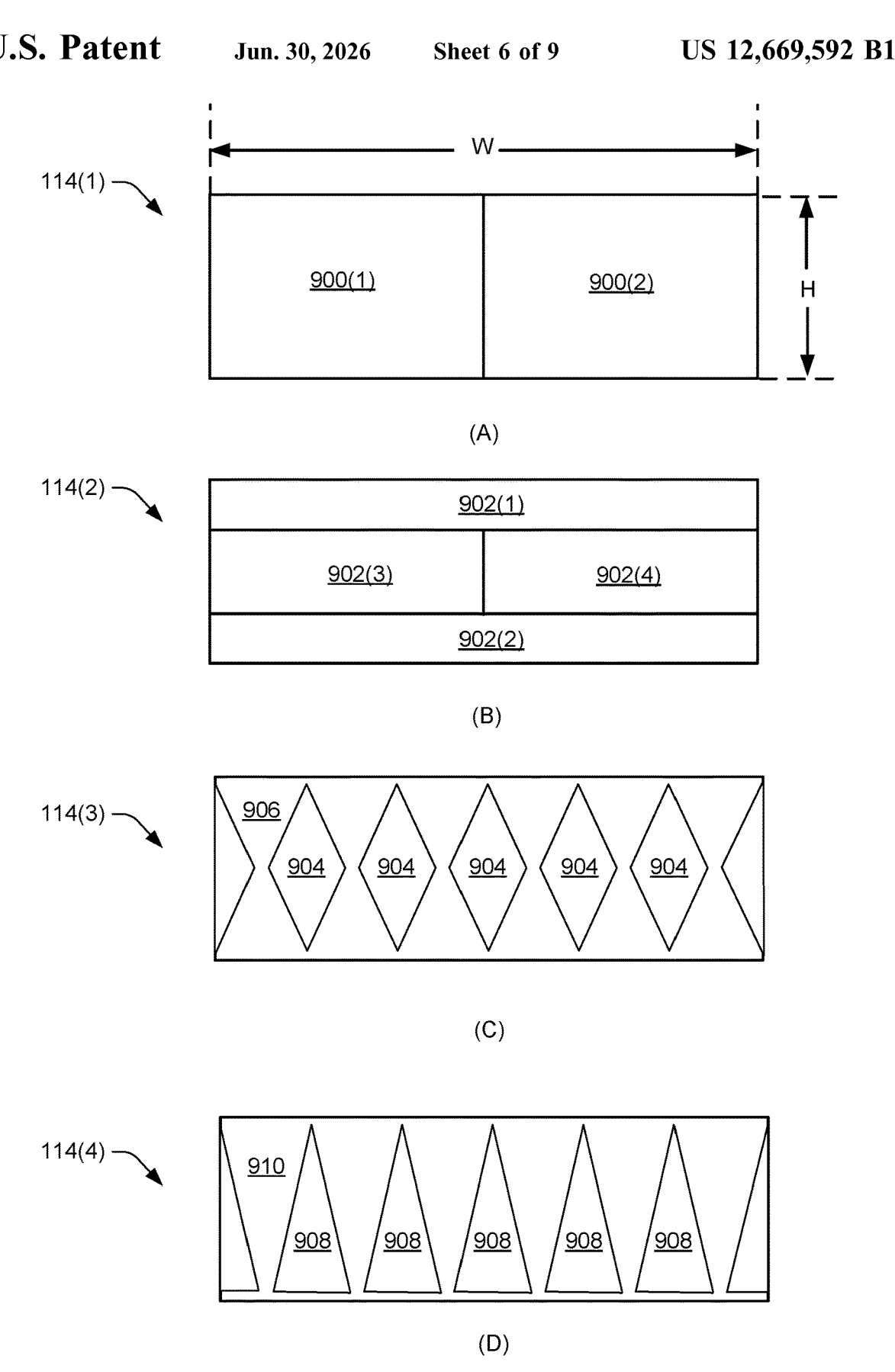
FIG. 9 illustrates various example fiducials with sections having different levels of reflectivity (or light absorption).

FIG. 9 illustrates various example fiducials 114 with sections having different levels of reflectivity. It is to be appreciated that the visible side of the example fiducials 114 shown in FIG. 9 represents the side of the fiducial 114 that is facing the LIDAR component 110, which can be the front side of the fiducial 114 when the fiducial 114 is disposed behind the LIDAR component 110. In the first example (A), a fiducial 114(1) is partitioned into two sections 900 including a first section 900(1) (e.g., left half) and a second section 900(2) (e.g., right half). The second section 900(2) is adjacent to the first section 900(1), and vice versa, and the sections 900 are in a side-by-side arrangement. The first section 900(1) may have a first reflectivity, and the second section 900(2) may have a second reflectivity different than the first reflectivity. This may be accomplished by using different materials and/or surface textures for the different sections 900, each material and/or surface texture having a different reflectivity. In some examples, the materials used for the sections 900 may be IR light absorbing materials (or IR absorbing materials) having different levels of IR light absorption (or IR absorption). For example, the first section 900(1) of the fiducial 114(1) may be made of an IR ink or film having a first level of IR absorption, and the second section 900(2) of the fiducial 114(1) may be made of a different IR ink or film having a second level of IR absorption that is greater than or less than the first level of IR absorption. In another example, the first section 900(1) of the fiducial 114(1) may be made of a rubber material with a first surface texture having a first level of IR absorption, and the second section 900(2) of the fiducial 114(1) may be made the rubber with a different surface texture (e.g., smoother surface or rougher surface) having a second level of IR absorption that is greater than or less than the first level of IR absorption. In an example where the fiducial 114(1) can be classified into low, medium, and high levels of reflectivity (or light absorption), one section (e.g., the first section 900(1))) may have a medium level of reflectivity, and the other section (e.g., the second section 900(2))) may have a low level of reflectivity. In another example, one section (e.g., the first section 900(1))) may have a high level of reflectivity, and the other section (e.g., the second section 900(2))) may have a medium level of reflectivity. In yet another example, one section (e.g., the first section 900(1))) may have a high level of reflectivity, and the other section (e.g., the second section 900(2))) may have a low level of reflectivity. As the light emitter 204 of the LIDAR component 110 rotates and emits light pulses along the width, W, of the fiducial 114(1), the differing levels of reflectivity (or light absorption) provided by the different sections 900 of the fiducial 114(1) provide coverage over the dynamic range of the light emitter 204. In this manner, regardless of the intensity of the light 112 emitted by the light emitter 204, the light detector 206 can detect a sufficiently strong return signal from at least one of the sections 900 of the fiducial 114(1). It is to be appreciated that the fiducial 114(1) having two sections 900 is exemplary, and that a fiducial can have more than two sections 900 along the width, W, of the fiducial, each with a different level of reflectivity (or light absorption) to provide coverage of light emitters 204 with a higher dynamic range.

In the second example (B), a fiducial 114(2) is partitioned into four sections 902 including a first (top) section 902(1) and a second (bottom) section 902(2), a third (middle) section 902(3) between the first (top) section 902(1) and the second (bottom) section 902(2), and a fourth (middle) section 902(4) between the first (top) section 902(1) and the second (bottom) section 902(2). The middle sections 902(3) and 902(4) are adjacent to each other in a side-by-side arrangement, and each middle section 902(3), 902 ((4) is adjacent to the first (top) section 902(1) and the second (bottom) section 902(2). It is to be appreciated that the fiducial 114(2) having two middle sections 902(3) and 902(4) is exemplary, and that a fiducial can have more than two middle sections 902(3) and 902(4) along the width, W, of the fiducial, each with a different level of reflectivity (or light absorption) to provide coverage of light emitters 204 with a higher dynamic range. Each section 902 of the fiducial 114(2) may have a different reflectivity (or light absorption) than the other sections 902. In some examples, however, the first (top) section 902(1) and the second (bottom) section 902(2) may have the same reflectivity (or light absorption), which is different than the reflectivity of either of the middle sections 902(3), 902(4). In some examples, the materials used for the sections 902 may be IR light absorbing materials (or IR absorbing materials) having different levels of IR light absorption (or IR absorption), and/or the surface textures may vary across the sections 902 to vary the reflectivity (or the light absorption), as described above. In an example where the fiducial 114(2) can be classified into low, medium, and high levels of reflectivity (or light absorption), the first (top) section 902(1) and the second (bottom) section 902(2) may have a low level of reflectivity, the third (middle) section 902(3) may have a medium level of reflectivity, and the fourth (middle) section 902(4) may have a high level of reflectivity. In this example (B), the middle sections 902(3), 902(4) of different reflectivity (or light absorption) relative to each other may cover the dynamic range of the light emitter 204 in the horizontal direction, like the example (A). In addition, the top and bottom sections 902(1), 902(2) of different reflectivity (or light absorption) relative to the middle sections 902(3), 902(4) may allow for detecting a malfunction of the LIDAR component 110 caused by a tilt of the light beam emitted by the light emitter 204, which may be caused by a title of a baffle of the LIDAR component 110 and/or a dislocation of the lens of the light emitter 204. For example, when the LIDAR component 110 is functional, the light 112 emitted by the light emitter 204 may be incident on the fiducial 114(2) within the middle sections 902(2), 902(4), but not the top or bottom sections 902(1), 902(2). However, if the angle of the light 112 emitted by the light emitter 204 changes unexpectedly and the light 112 emitted by the light emitter 204 becomes incident on the fiducial 114(2) within the top or bottom section 902(1), 902(2), this tilt condition may cause the distance readings from the LIDAR component 110 to move outside of the predetermined range of values defined for the fiducial 114(2), resulting in the detection of a malfunction of the LIDAR component 110. This may be detected by performing the process 116 of FIG. 1, for example. It is to be appreciated that a "tilt" of the light beam emitted by the light emitter 204 may be detected in any suitable direction, such as tilt in a direction of roll, pitch, or yaw rotation.

In the third example (C), a fiducial 114(3) is partitioned into a repeating pattern of sections 904 arranged in a row (or line) that runs along the width, W, of the fiducial 114(3). The individual sections 904 have a variable width in a vertical direction (i.e., along the height, H, of the fiducial 114(3)). In this case, the sections 904 are diamond-shaped sections 904, which are widest in the middle of the section 904, and the sections 904 become progressively thinner in the upwards and downwards directions vertically. It is to be appreciated that the sections 904 could have other shapes with or without variable width in the vertical direction, such as circular sections 904, rectangular sections 904, etc. The sections 904 may have a first reflectivity, and the region(s) 906 between adjacent pairs of the sections 904 may have a second reflectivity different than the first reflectivity. In some examples, the respective materials used for the sections 904 and the region(s) 906 may be IR light absorbing materials (or IR absorbing materials) having different levels of IR light absorption (or IR absorption), and/or the surface texture of the sections 904 may be different than the surface texture of the region(s) 906 to vary the reflectivity (or the light absorption), as described above. In an example where the fiducial 114(3) can be classified into low, medium, and high levels of reflectivity (or light absorption), the sections 904 may have a high level of reflectivity, and the region(s) 906 between the sections 904 may have a low level of reflectivity. In another example, the sections 904 may have a medium level of reflectivity, and the region(s) 906 between the sections 904 may have a low level of reflectivity. In another example, the sections 904 may have a low level of reflectivity, and the region(s) 906 between the sections 904 may have a medium or high level of reflectivity. In this manner, if the LIDAR component 110 is functional, the light 112 emitted by the light emitter 204 is incident on the fiducial 114(3) across the middle of the fiducial 114(3) where the sections 904 are the widest. Accordingly, the output of the LIDAR component 110 may exhibit the differences in reflectivity (or light absorption) along the width, W, of the fiducial 114(3) (e.g., longer sequences of distance readings in the sections 904 having the first reflectivity, and shorter sequences of distance readings in the region(s) 906 having the second reflectivity). This is what is expected when the LIDAR component 110 is functional. However, if the light 112 emitted by the light emitter 204 starts to tilt up or down, the output of the LIDAR component 110 may exhibit different sequences of distance readings (e.g., progressively shorter sequences of distance readings in the sections 904 having the first reflectivity, and progressively longer sequences of distance readings in the region(s) 906 having the second reflectivity). This allows for detecting a tilt malfunction of the LIDAR component 110 (e.g., using the process 116 described herein), even though a direction of the tilt malfunction (e.g., upwards or downwards) is not diagnosable with the example fiducial 114(3).

In the fourth example (D), a fiducial 114(4) is partitioned into a repeating pattern of sections 908 arranged in a row (or line) that runs along the width, W, of the fiducial 114(4). The individual sections 908 have a variable width in a vertical direction (i.e., along the height, H, of the fiducial 114(4)). In this case, the sections 908 are triangle-shaped sections 908, which may be widest at the bottom, and the sections 908 become progressively thinner in the upwards directions vertically, or vice versa (e.g., if the triangular sections 908 are flipped 180 degrees). The sections 908 may have a first reflectivity, and the region(s) 910 between adjacent pairs of the sections 908 may have a second reflectivity different than the first reflectivity. In some examples, the respective materials used for the sections 908 and the region(s) 910 may be IR light absorbing materials (or IR absorbing materials) having different levels of IR light absorption (or IR absorption), and/or the surface texture of the sections 908 may be different than the surface texture of the region(s) 910 to vary reflectivity (or the light absorption), as described above. In an example where the fiducial 114(4) can be classified into low, medium, and high levels of reflectivity (or light absorption), the sections 908 may have a high level of reflectivity, and the region(s) 910 between the sections 908 may have a low level of reflectivity. In another example, the sections 908 may have a medium level of reflectivity, and the region(s) 910 between the sections 908 may have a low level of reflectivity. In another example, the sections 908 may have a low level of reflectivity, and the region(s) 910 between the sections 908 may have a medium or high level of reflectivity. In this manner, if the LIDAR component 110 is functional, the light 112 emitted by the light emitter 204 is incident on the fiducial 114(4) across the middle of the fiducial 114(3) where the sections 908 have a particular, known width. Accordingly, the output of the LIDAR component 110 may exhibit the differences in reflectivity (or light absorption) along the width, W, of the fiducial 114(4) (e.g., first sequences of distance readings in the sections 908 having the first reflectivity, and second sequences of distance readings in the region(s) 910 having the second reflectivity, whether the first and second sequences may include substantially the same number of distance readings). This is what is expected when the LIDAR component 110 is functional. However, if the light 112 emitted by the light emitter 204 starts to tilt up or down, the output of the LIDAR component 110 may exhibit different sequences of distance readings, and the direction of tilt may be diagnosable with the fiducial 114(4). For example, if the light 112 starts to tilt upward, the LIDAR component 110 may output progressively shorter sequences of distance readings in the sections 908 having the first reflectivity, and progressively longer sequences of distance readings in the region(s) 910 having the second reflectivity, whereas, if the light 112 starts to tilt downward, the LIDAR component 110 may output progressively longer sequences of distance readings in the sections 908 having the first reflectivity, and progressively shorter sequences of distance readings in the region(s) 910 having the second reflectivity. This not only allows for detecting a tilt malfunction of the LIDAR component 110 (e.g., using the process 116 described herein), but it also allows for diagnosing the direction of the tilt malfunction (e.g., upwards or downwards).

Furthermore, the example fiducials 114(3) and 114(4) of FIG. 9 may allow for diagnosing a malfunction that is not classified as a failure of the LIDAR component 110, which can allow for outputting a notification (e.g., displaying a notification on the AMD 102, on a user device, etc.) to perform preventative maintenance on the LIDAR component 110. In other words, if the light 112 emitted by the light emitter 204 is starting to drift away from the middle of the fiducial 114(3), 114(4) in either direction vertically (e.g., upwards or downwards), but the tilt angle of the light 112 remains below a threshold tilt angle, the LIDAR component 110 may remain functional and safe, but the slight tilt malfunction may be an indicator that the LIDAR component 110 is likely to fail at some point in the future, and that the LIDAR component 110 should be serviced to prevent it from failing and becoming unsafe to use in the AMD 102. Thus, the patterned fiducials 114(3), 114(4) can provide the AMD 102 with a warning of a potential failure before the LIDAR component 110 actually fails and can no longer be used in a safe and/or reliable manner.

In some examples, the patterned fiducials 114(3), 114(4) depicted in FIG. 9 can be used in a factory during calibration of the LIDAR component 110, before the AMD 102 is deployed in the field (e.g., sold to a consumer). For example, light 112 emitted from a particular LIDAR component 110 may not be incident exactly in the middle of the fiducial 114(3), 114(4) (e.g., the light 112 may be offset slightly in a vertical direction), yet the LIDAR component 110 may be functional and safe to use in that condition/state. Accordingly, the LIDAR component 110 can be calibrated with the slight offset in the vertical direction to avoid a false positive of a detected malfunction of the LIDAR component 110 when it is used in the AMD 102 in someone's home.

It is to be appreciated that the example fiducials 114(1)-(4) depicted in FIG. 9 may be implemented as multiple separate fiducials having different reflectivity instead of a fiducial partitioned into multiple sections. For example, the fiducial 114(1) may be replaced with a first fiducial having a first reflectivity and a second fiducial having a second reflectivity. In this example, the separate fiducials may be positioned next to each other in a side-by-side arrangement, both fiducials being disposed in a path of light 112 that is to be emitted by the LIDAR component 110. It is also to be appreciated that the width, W, and the height, H, of any of the example fiducials 114 described herein may vary, depending on the application. In some examples, the width, W, is within a range of about 0.5 centimeters (cm) to about 3 cm. In some examples, the width, W, is about 2.5 cm. This may correspond to a particular azimuth angle 202 range over which the light emitter 204 and the light detector 206 rotate while emitting light pulses towards, and receiving reflected light pulses from, the fiducial 114. In some examples, this azimuth angle 202 range associated with the fiducial 114 may be about 50 to 100 degrees. In some examples, the LIDAR component 110 is configured to output about 125 data points (e.g., distance values) associated with the fiducial 114 per frame. At a frame rate of N Hz, this would mean that N×125 data points (e.g., distance values) associated with the fiducial 114 may be obtained every second. In some examples, the height, H, is within a range of about 0.5 cm to about 2 cm. In some examples, the height, H, is about 1.3 cm.

As mentioned, the fiducial 114 can be used to determine if the LIDAR component 110 has malfunctioned, wherein a malfunction may include a failure. A failed LIDAR component 110 may not be safe for the AMD 102 to use due to a risk of a potential hazard while using the failed LIDAR component 110, such as driving over a cliff, colliding with an obstacle (e.g., a person, a pet, etc.). The following is an example list of failure modes that can be detected using the fiducial-based detection and/or diagnostics function described herein, such as the process 116. It is to be appreciated, however, that the following list of failure modes is non-exhaustive:

Dust Ingress into Module
Dust Occluding Cover glass
Too much ambient light
Vertical-cavity surface-emitting laser (VCSEL) extra flare from lens
VCSEL lens position or angle shift
VCSEL lens transmission too low
VCSEL lens transmission reduces over time
VCSEL optical power too low
VCSEL pointing angle shift in the field (e.g., from bump)
VCSEL field of illumination (FOI) too narrow
VCSEL FOI too wide
Single-Photon Avalanche Diode (SPAD) responsivity too low
SPAD responsivity too high
SPAD pointing angle shift
SPAD lens transmission too low
Change in lens optical (transmission) properties over time
Motor Fouling, Increased Resistance
Motor Fouling, Increased Temperature
VCSEL lens falls from the holder
VCSEL Terminal short
VCSEL Terminal Open
SPAD lens position or angle shift
SPAD Lens fails from the holder
Chip malfunction-all other failures
Motor Sensor Failure, n signal
Motor Sensor Failure, Intermittent Value
Motor Sensor Failure, Constant value
Connector Intermittent Contact
Cable Intermittent Contact
Motor sensor connectivity break Open or short to GnD
Motor sensor connectivity break Short to VDD 3V
Motor sensor short to phase Motor Phase Connectivity Break (inside the motor), Phase A, B or C Voltage shorted low Intermittent voltage Voltage high Universal asynchronous receiver-transmitter (UART) Overrun error UART Underrun error UART Framing error UART Parity error UART Break condition Light fidelity (Li-Fi) failure Inaccurate reading VCSEL optical power too high The above list of failure modes may be part of a failure modes effects and diagnostic analysis (FMEDA) function of the AMD's 102 safety subsystem. For example, if the AMD 102 is to be certified to a functional safety standard, such as International Organization for Standardization (ISO) 13849, a list of failure modes, such as the above list of failure modes, may be used to certify the AMD 102 to such a functional safety standard.

FIG. 10 is a flow diagram of an example process 1000 for detecting and/or diagnosing a malfunction of a LIDAR component 110 using a fiducial 114 of the LIDAR subsystem 108.

At 1002, a processor(s) (e.g., a processor of the AMD 102) may execute computer-executable instructions to allow the AMD 102 to move autonomously through an environment 100 (or a space), such as by the AMD 102 moving (e.g., driving) over a floor 104 of an environment 100. In other words, a safety subsystem of the AMD 102 may be configured to stop movement of the AMD 102 as a safety measure, and thereby allows another subsystem (e.g., a mobility subsystem) of the AMD 102 to move the AMD 102 autonomously without otherwise inhibiting the movement at 1002. In some examples, however, the operations performed at block 1002 can involve causing the AMD 102 to move. For example, the processor(s) may cause the AMD 102 to rotate its wheels to move (e.g., drive) over the floor 104 in a forward direction of travel. It is also to be appreciated that the AMD 102 may be operated in various different operating modes including, without limitation, a user-control mode or a manual mode where the movement (e.g., determining a direction of travel and/or a path) of the AMD 102 is manually controlled by a user. In some examples, the movement of the AMD 102 may be semi-autonomous movement in that a user may control some of the movement of the AMD 102 while other movement may be autonomous movement. Accordingly, where autonomous movement is discussed herein, it is to be appreciated that the movement can be semi-autonomous or user-controlled, in some implementations.

At 1004, the processor(s) may receive, from the LIDAR component 110 of the AMD 102, and over a series of frames while the light emitter 204 and the light detector 206 rotate at the frame rate, a plurality of distance values indicative of distances from the LIDAR component 110 to points on a fiducial 114 that is disposed in a path of light 112 emitted by the LIDAR component 110. For example, while the light emitter 204 and the light detector 206 are rotating at a frame rate within the head 200 of the LIDAR component 110, the light emitter 204 is configured to emit pulsed laser light 112 over an azimuth angle 202 range corresponding to the fiducial 114, and the light detector 206 is configured to detect the reflected pulses of light 112 reflected from the fiducial 114. The distance values (or distance readings)

provided by the LIDAR component 110 may be based at least in part on a time between the emission of a pulse of light 112 to the detection of the reflected pulse of light 112. For example, a measured time value for an individual pulse may be converted into a digitized value (distance value). Because the light emitter 204 and the light detector 206 of the LIDAR component 110 are rotating at a particular frequency (or frame rate) and emitting a series of light pulses over the course of one revolution, the distance data may be provided as a series of values (or distance readings).

At 1006, the processor(s) may determine a value based at least in part on the distance values received at block 1004. In some examples, this value can be a single distance value (or distance reading). At sub-block 1008, determining the value may include computing an average of the plurality of distance values received at block 1004 over a series of frames. Computing an average of a plurality of distance values at sub-block 1008 may help to remove noise in the distance data output by the LIDAR component 110. For example, SPAD-based LIDAR components do not detect, with high accuracy, objects that are very close to the light emitter 204 and the light detector 206. As a result, there may be noise in the distance values (or distance readings) of a fiducial 114 that is positioned close to (e.g., within a threshold distance of) the head 200 of the LIDAR component 110. Computing the average 1008 periodically (e.g., every second, every few seconds, etc.) can provide a steady distance reading from the fiducial 114. The average computed at block 1008 can be a temporal average. For example, if, say, the LIDAR component 110 operates at a frame rate of N Hz, the LIDAR component 110 outputs N data points (or distance values) for a given point on the fiducial 114 every second. Accordingly, the average computed at sub-block 1008 may be the average of those N data points (or distance values) associated with the particular point on the fiducial 114: a "temporal average." Additionally, or alternatively, the average computed at block 1008 can be a spatial average. For example, with each revolution (or frame), the LIDAR component 110 outputs P data points (or distance values) associated with the fiducial 114. In an example where the LIDAR component 110 operates at a frame rate of N Hz, N×P data points (or distance values) are obtained for the fiducial 114 each second (or after N full revolutions). Accordingly, the average computed at sub-block 1008 may be the average of those N×P data points (or distance values) associated with the entire fiducial 114.

At sub-block 1010, determining the value may include determining a confidence value associated with the distance data received at block 1004. For example, in addition to distance values (or distance readings), the LIDAR component 110 and/or a downstream component may generate confidence values (or confidence readings) associated with the distance values (or distance readings), which indicate the confidence that the distance values are accurate. In any case, the confidence value determined at sub-block 1010 can be a single confidence value (or confidence reading), or a statistic that is computed based on a plurality of confidence values (or confidence readings), such as an average of a plurality of confidence values provided by the LIDAR component 110.

At 1012, the processor(s) may compare the value to the predetermined range of values defined for the fiducial 114, which provides a reference, ground truth, and/or a basis of comparison for the safety subsystem of the AMD 102 to determine whether the LIDAR component 110 is functioning properly, or, in the alternative, whether the LIDAR component 110 has malfunctioned. Based on this comparison, the processor(s) can determine whether the value is outside of the predetermined range of values. If the value is outside of the predetermined range of values ("out of bounds") at block 1012, this may be indicative of the LIDAR component 110 having malfunctioned (e.g., failed), and the process 1000 may follow the YES route from block 1012 to block 1014.

At 1014, the processor(s) may cause the AMD 102 to perform an action(s) based at least in part on determining that the value is outside of the predetermined range of values, which may be indicative of a malfunction of the LIDAR component 110. The action(s) performed at block 1014 may include any of the actions described above with reference to block 124 of the process 116, such as an action(s) to avoid a potential hazard, such as driving over a cliff (e.g., a staircase, a ledge, etc.) or colliding with an obstacle (e.g., furniture, a person, a pet, etc.). In an example, the action(s) performed at block 1014 may include causing the AMD 102 to stop moving, such as by applying the breaks of the AMD 102.

If, at block 1012, the value is within the predetermined range of values, the process 1000 may follow the NO route from block 1012 to block 1016 where the processor(s) may determine whether the LIDAR component 110 has malfunctioned without failing. For example, as noted above with respect to the patterned fiducials 114(3), 114(4), the distance values (or distance readings) associated with the fiducial 114(3), 114(4) may allow for diagnosing a malfunction of the LIDAR component 110, such as a tilt malfunction where the angle at which the light 112 is emitted from the LIDAR component 110 is starting to drift in a vertical direction (e.g., upwards or downwards). In this scenario, the LIDAR component 110 may not have failed to the point where the LIDAR component 110 is unsafe to use. Instead, the LIDAR component 110 may still be functional and safe for the AMD 102 to utilize for floor-detection, yet the detection of the tilt malfunction, and possibly a diagnosis of which direction the LIDAR component 110 is starting to tilt, may be made. In this case, the process 1000 may follow the YES route from block 1016 to block 1018 where the processor(s) may cause the AMD 102 to output (e.g., display, send, etc.) a notification based on a diagnosed malfunction of the LIDAR component 110. Such a notification may indicate that preventative maintenance on the LIDAR component 110 is recommended.

If, at block 1016, the processor(s) determine that the LIDAR component 110 has not malfunctioned and that the LIDAR component 110 is functional, the process 1000 may follow the NO route from block 1016 back to block 1002 where the processor(s) may iterate the process 1000. As shown by the arrow from block 1018 to block 1002, the process 1000 may also iterate following block 1018 (e.g., after outputting a notification to perform preventative maintenance on the LIDAR component 110).

FIG. 11 is a flow diagram of an example process 1100 for using a fiducial 114 to compensate for temperature drift. At 1102, a processor(s) (e.g., a processor of the AMD 102) may execute computer-executable instructions to receive, from the LIDAR component 110, and based at least in part on first light 112 emitted by the LIDAR component 110 towards the fiducial 114, first distance data including one or more first distance values. The first distance value(s) included in the first distance data may be indicative of one or more first distances between the LIDAR component 110 and one or more points on a fiducial 114 disposed in a path of light 112 emitted by the LIDAR component 110. For example, as the light emitter 204 and the light detector 206 of the LIDAR component 110 rotate (during one or more revolutions) over a particular azimuth angle 202 range associated with the fiducial 114, the light emitter 204 is configured to emit pulsed laser light 112 towards the fiducial 114, and the light detector 206 is configured to detect the reflected pulses of light 112 reflected from the fiducial 114. Because the light emitter 204 and the light detector 206 of the LIDAR component 110 are rotating at a particular frequency and emitting a series of light pulses during rotation, the first distance data may be received at block 1102 as a series of values (or distance readings) associated with a single revolution (e.g., a single frame) or multiple revolutions (e.g., multiple frames).

At 1104, the processor(s) may receive, from the LIDAR component 110, and based at least in part on second light 112 emitted by the LIDAR component 110 towards the fiducial 114, second distance data including one or more second distance values. The second distance value(s) included in the second distance data may be indicative of one or more second distances between the LIDAR component 110 and the one or more points on the fiducial 114. For example, as the light emitter 204 and the light detector 206 of the LIDAR component 110 rotate (during one or more subsequent revolutions) over the particular azimuth angle 202 range associated with the fiducial 114, the light emitter 204 is configured to emit pulsed laser light 112 towards the fiducial 114, and the light detector 206 is configured to detect the reflected pulses of light 112 reflected from the fiducial 114. The second distance data may be received at block 1104 as a series of values (or distance readings) associated with a single revolution (e.g., a single frame) or multiple revolutions (e.g., multiple frames).

At 1106, the processor(s) may determine whether a temperature drift (e.g., a change in temperature of the LIDAR component 110) has occurred between a first time of receiving the first distance data at block 1102 and a second time of receiving the second distance data at block 1104. If a temperature sensor of the LIDAR component 110 is accessible to the processor(s), the temperature drift may be determined at block 1106 from the outputs (e.g., temperature data) of the temperature sensor during this time period. However, if such a temperature sensor is inaccessible to the processor(s), the first distance data received at block 1102 and the second distance data received at block 1104 may be used as a proxy for determining the temperature drift at block 1106. That is, the distance values (or readings) associated with the fiducial 114 can be processed (e.g., analyzed) to determine if a temperature drift has occurred. For instance, the processor(s) may determine, at block 1106, whether a change in temperature has caused the one or more second distance values to be different than the one or more first distance values by an amount that is less than or equal to a threshold amount. This may be computed based on averaging a plurality of the first distance values to obtain a first average, averaging a plurality of the second distance values to obtain a second average, and computing the difference between the second average and the first average. That is, a temperature drift of the LIDAR component 110 may cause a very small drift (e.g., on the order of two or three cm) in the distance readings associated with the fiducial 114, and it is unlikely that a temperature drift would cause a much larger change in the distance readings. Thus, a change in distance readings associated with the fiducial 114 that is less than or equal to a threshold amount may be indicative of a temperature drift of the LIDAR component 110. If a temperature drift has occurred at block 1106 (e.g., as determined based on a below-threshold drift in the distance readings associated with the fiducial 114), the process 1100 may follow the YES route from block 1106 to block 1108.

At 1108, the processor(s) may receive, from the LIDAR component 110, and based at least in part on third light 112 emitted by the LIDAR component 110 towards a floor 104 below the AMD 102, third distance data including one or more third distance values. The third distance value(s) may be indicative of one or more third distances between the LIDAR component 110 and one or more points on the floor 104 below the AMD 102. For example, as the light emitter 204 and the light detector 206 of the LIDAR component 110 rotate during a given revolution over a particular azimuth angle range associated with the light 112 directed towards the floor 104, the light emitter 204 is configured to emit pulsed laser light 112 that is directed towards the floor 104, and the light detector 206 is configured to detect the reflected pulses of light 112 reflected from the floor 104. The third distance data may be received at block 1108 as a series of values (or distance readings) associated with a single revolution (e.g., a single frame) or multiple revolutions (e.g., multiple frames).

At 1110, the processor(s) may add the amount (e.g., the difference between the second average and the first average) to, or subtract the amount from, the one or more third distance values to compensate for the temperature drift (e.g., change in temperature) of the LIDAR component 110. If, at block 1106, a temperature drift has not occurred (e.g., as determined based on no detectable drift in the distance readings associated with the fiducial 114), the process 1100 may follow the NO route from block 1106 to block 1112.

At 1112, the processor(s) may receive, from the LIDAR component 110, and based at least in part on third light 112 emitted by the LIDAR component 110 towards a floor 104 below the AMD 102, third distance data including one or more third distance values. The third distance value(s) may be indicative of one or more third distances between the LIDAR component 110 and one or more points on the floor 104 below the AMD 102, similar to block 1108.

At 1114, the processor(s) may use the one or more third distance values for ranging without compensating for temperature drift. For example, the processor(s) may refrain from adding an amount to, or subtracting an amount from, the one or more third distances, because there is no need to compensate for temperature drift if a temperature drift has not occurred.

Figure 12:
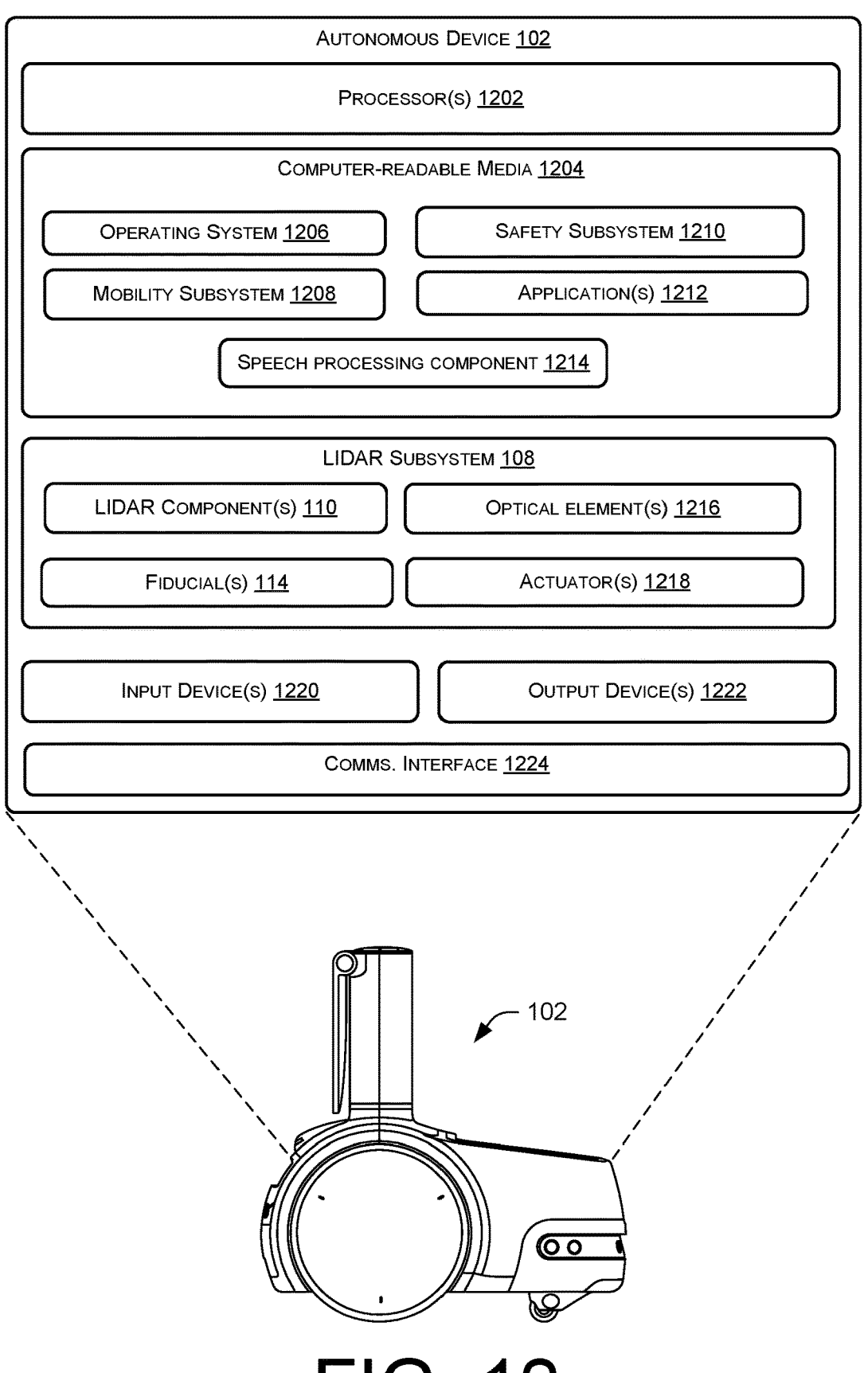
FIG. 12 illustrates example components of an AMD, such as the AMD of FIG. 1.

FIG. 12 illustrates example components of an AMD 102, such as the AMD 102 of FIG. 1. It is to be appreciated that the example components depicted in FIG. 12 may be included in the AMD 102 operating as a standalone device. Additionally, or alternatively, at least some of the components depicted in FIG. 12 may be included in a remote (or external) device separate from the AMD 102. In this sense, the AMD 102 (and/or the one or more components thereof) may be part of a system, which may be distributed across multiple devices, or part of a single, standalone device, such as the AMD 102. The AMD 102, may be implemented as robot, in some examples. In certain implementations, a limited set of one or more input components may be employed (e.g., a dedicated button to initiate a configuration, power on/off, etc.), and the primary mode of user interaction with the AMD 102 may be through voice input and audible output. The AMD 102 may also be implemented in other form factors besides a robot, as described herein.

In the illustrated implementation, the AMD 102 includes one or more processors 1202 and computer-readable media 1204 (which may be referred to herein as "memory" of the AMD 102, and/or "local memory" of the AMD 102). In some implementations, the processors(s) 1202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1202 may possess its own local memory, which also may store program modules, program data and/or other data, and/or one or more operating systems.

The computer-readable media 1204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1204 may be implemented as computer-readable storage media ("CRSM"), which may be any available physical media accessible by the processor(s) 1202 to execute instructions stored on the memory 1204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1202.

Several modules such as instruction, datastores, and so forth may be stored within the computer-readable media 1204 and configured to execute on the processor(s) 1202. A few example functional modules are shown as applications stored in the computer-readable media 1204 and executed on the processor(s) 1202, although the same functionality may alternatively be implemented in hardware, firmware, or as a system on a chip (SOC).

An operating system 1206 may be configured to manage hardware within and coupled to the AMD 102 for the benefit of other modules. In addition, the AMD 102 may include a mobility subsystem 1208 to control movement of the AMD 102 within an environment 100 or through a space (e.g., over a floor 104). For example, the mobility subsystem 1208 may control propulsion and/or turning maneuvers of the AMD 102. In some examples, the mobility subsystem 1208 may handle navigation functions, such as navigating from an origin to a destination, and/or the generation and use of a map (e.g., an obstacle map) for obstacle avoidance during movement. In some examples, the mobility subsystem 1208 may utilize a simultaneous localization and mapping (SLAM) algorithm in conjunction with one or more sensors of the AMD 102. The LIDAR component(s) 110 and/or the LIDAR subsystem 108 described herein may be used as a sensor(s) for such a SLAM algorithm to enable complex movement of the AMD 102. The AMD 102 may further include a safety subsystem 1210 to monitor for hazards and to take preventative and/or remedial action, such as stopping the movement of the AMD 102, implementing a preventative maneuver, and/or outputting a warning, an alert, or the like. For example, the safety subsystem 1210 may utilize distance data associated with the fiducial 114, as described herein, to implement failure detection and diagnostics with respect to the LIDAR component 110.

The AMD 102 may also include one or more applications 1212 stored in the computer-readable media 1204 or otherwise accessible to the AMD 102. For example, the applications 1212 may include, without limitation, a music player, a movie player, a timer, and a personal shopper, or any other suitable application. The AMD 102 may also include a speech processing component 1214 configured to recognize user speech. For example, a user may speak to the AMD 102, and the AMD 102 may perform an action in response to the user speech. The AMD 102 may utilize a remote system for speech processing, and/or the speech processing component 1214 may be a local speech processing component configured to process speech without relying on a remote speech processing system. Additionally, or alternatively, the speech processing component 1214 may be configured to implement a hybrid approach where some speech processing is performed in the "cloud" and some speech processing is performed locally.

The AMD 102 may further conclude the LIDAR subsystem 108 described herein in its various implementations. The LIDAR subsystem 108 may include at least a LIDAR component 110, and possibly multiple LIDAR components 110. The LIDAR subsystem 108 may further include a fiducial 114, and possibly multiple fiducials 114, as described herein. The LIDAR subsystem 108 may further include an optical element(s) 1216, such as, without limitation, a mirror(s), a prism(s), a diffraction grating(s), a lens(s), or the like. The optical element(s) 1216 may be used to direct light 112 emitted by the LIDAR component 110 towards the floor 104 below the AMD 102, in some examples. In some examples, the LIDAR subsystem 108 may include an actuator(s) 1218 to allow for adjusting the orientation of the optical element(s) 1216 and/or the LIDAR component(s) 110 in real-time, during operation of the AMD 102.

Generally, the AMD 102 has input devices 1220 and output devices 1222. The input devices 1220 may include, without limitation, a keyboard, keypad, mouse, touch screen, joystick, control buttons, etc. In some implementations, one or more microphones may function as input devices 1220 to receive audio input, such as user voice input. Additionally, or alternatively, the LIDAR component(s) 110 may function as an input device(s) 1220 to provide floor detection capabilities, as described herein. The output device(s) 1222 may include, without limitation, a display(s), a light element (e.g., LED), a vibrator to create haptic sensations, or the like. In some implementations, one or more speakers may function as output devices 1222 to output audio sounds (e.g., audio content, text-to-speech (TTS) responses, other voice prompts, tones at various frequencies, etc.). A user may interact with the AMD 102 by speaking to it, and the AMD 102 can communicate back to the user by emitting audible statements through a speaker(s). In this manner, the user 104 can interact with the AMD 102 solely through speech, without use of a keyboard or display. Additionally, or alternatively, motors, wheels, gears, movable legs, propellers, or the like may function as output devices 1222 to control movement of the AMD 102 within and/or through an environment 100, such as by propelling and/or turning the AMD 102 in any direction and at various speeds and accelerations.

The AMD 102 may further include a communications interface 1224, such as a wireless unit coupled to an antenna to facilitate a wireless connection to a network. Such a wireless unit may implement one or more of various wireless and/or IoT technologies, such as Bluetooth® protocol, Bluetooth Low Energy (BLE) protocol, ZigBee R protocol, Z-Wave® protocol, WiFi protocol, and/or any other type of protocol usable to communicate wirelessly between electronic devices in an environment, including those that do and/or do not rely data transmission over a wide area network. The communications interface 1224 may also include a universal serial bus (USB) port(s) to facilitate a wired connection to a network, or a plug-in network device that communicates with other wireless networks. In addition to the USB port, or as an alternative thereto, other forms of wired connections may be employed, such as a broadband connection, Transmission Control Protocol/Internet Protocol (TCP/IP) protocol connection, etc. The communications interface 1224 may include some or all of these components, and/or other components to facilitate communication with other devices.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A household robot system comprising:

a household robot configured to move autonomously over a floor;

a light detection and ranging (LIDAR) subsystem comprising:

a LIDAR component mounted to a body of the household robot at a front side of the household robot, wherein the LIDAR component is configured to emit first light pulses that are in a first direction towards the floor in front of the household robot and in a second direction associated with malfunction detection; and a fiducial coupled to at least one of the LIDAR component or the body, wherein the fiducial is disposed behind the LIDAR component in a path of second light pulses emitted by the LIDAR component towards the fiducial in the second direction; and a processor configured to, during the operation of the robot:

cause the household robot to move autonomously over the floor;

receive, from the LIDAR component, and based on the second light pulses, distance data indicative of distances between the LIDAR component and points on the fiducial;

determine a value based at least in part on the distance data;

determine that the value is outside of a predetermined range of values indicating that the LIDAR component has malfunctioned; and cause the household robot to stop moving based at least in part on determining that the value is outside of the predetermined range of values.

2. The household robot system of claim 1, wherein:

the LIDAR component comprises a light emitter and a light detector disposed behind a cover glass; and the fiducial is coupled to the LIDAR component by the fiducial being adhered to the cover glass with an adhesive.

3. The household robot system of claim 1, wherein:

the LIDAR component comprises:

a base;

a head having a light emitter and a light detector; and a target coupled to the base, the target extending above a top side of the base, and spaced a distance from the head; and the fiducial is coupled to the LIDAR component by the fiducial being disposed on a front surface of the target.

4. The household robot system of claim 1, wherein:

the LIDAR component comprises a head having a light emitter and a light detector; and the fiducial is coupled to the body of the household robot by the fiducial being disposed on a front surface of a rear LIDAR cover that is:

coupled to the body of the household robot;

disposed behind the LIDAR component; and spaced a distance from the head.

5. The household robot system of claim 1, wherein the fiducial comprises:

a first section having a first reflectivity; and a second section beside the first section, the second section having a second reflectivity different than the first reflectivity.

6. A system comprising:

an autonomous device;

a light detection and ranging (LIDAR) subsystem comprising:

a LIDAR component coupled to a body of the autonomous device, wherein the LIDAR component is configured to emit light in a first path associated with a forward direction of travel of the autonomous device and a second path associated with malfunction detection; and a fiducial coupled to at least one of the LIDAR component or the body of the autonomous device, wherein the fiducial is disposed in the second path; and a processor configured to, during the operation of the autonomous device:

receive, from the LIDAR component, distance data indicative of one or more distances between the LIDAR component and one or more points on the fiducial;

determine a value based at least in part on the distance data;

determine that the value is outside of a predetermined range of values indicating a malfunction; and cause the autonomous device to perform an action based at least in part on determining that the value is outside of the predetermined range of values.

7. The system of claim 6, wherein the fiducial is disposed behind the LIDAR component.

8. The system of claim 6, wherein:

the LIDAR component comprises a head having:

a cover; and a light emitter and a light detector disposed within the cover; and the fiducial is coupled to the LIDAR component by the fiducial being disposed on the cover.

9. The system of claim 6, wherein:

the LIDAR component comprises:

a base;

a head having a light emitter and a light detector; and a target coupled to the base, the target extending above a top side of the base, and spaced a distance from the head; and the fiducial is coupled to the LIDAR component by the fiducial being disposed on a front surface of target.

10. The system of claim 6, wherein:

the LIDAR component comprises a head having a light emitter and a light detector; and the fiducial is coupled to the body of the autonomous device by the fiducial being disposed on a front surface of a rear cover that is:

coupled to the body of the autonomous device;

disposed behind the LIDAR component; and spaced a distance from the head.

11. The system of claim 6, wherein:

the LIDAR component comprises a light emitter and a light detector that are configured to rotate at a frame rate;

the distance data comprises a plurality of distance values obtained over a series of frames while the light emitter and the light detector rotate at the frame rate; and determining the value based at least in part on the distance data comprises computing an average of the plurality of distance values.

12. The system of claim 6, wherein the fiducial comprises:

a first section having a first reflectivity; and a second section adjacent to the first section, the second section having a second reflectivity different than the first reflectivity.

13. The system of claim 6, wherein the fiducial comprises:

a top section;

a bottom section; and a middle section between the top section and the bottom section, the middle section having a reflectivity that is different than:

a reflectivity of the top section; and a reflectivity of the bottom section.

14. The system of claim 6, wherein the fiducial comprises:

a repeating pattern of sections having a first reflectivity, individual sections of the sections having a variable width in a vertical direction; and regions between the sections having a second reflectivity different than the first reflectivity.

15. The system of claim 6, wherein determining the value based at least in part on the distance data comprises determining a confidence value associated with the distance data.

16. A method comprising:

receiving, by a processor, and from a light detection and ranging (LIDAR) component mounted to a body of a robot, first distance data associated with first light pulses emitted by the LIDAR component in a first direction in front of the robot;

receiving, by the processor and during the operation of the robot, and from the LIDAR component, second distance data associated with second light pulses emitted by the LIDAR component in a second direction behind the robot, the second distance data indicative of one or more distances between the LIDAR component and one or more points on a fiducial disposed in a path of light emitted by the LIDAR component in the second direction;

determining, by the processor, a value based at least in part on the second distance data;

determining, by the processor, that the value is outside of a predetermined range of values indicating a malfunction; and causing, by the processor, an autonomous device to perform an action based at least in part on determining that the value is outside of the predetermined range of values.

17. The method of claim 16, wherein:

the LIDAR component comprises a light emitter and a light detector that are configured to rotate at a frame rate;

the distance data comprises a plurality of distance values obtained over a series of frames while the light emitter and the light detector rotate at the frame rate; and the determining the value based at least in part on the distance data comprises computing an average of the plurality of distance values.

18. The method of claim 16, wherein the fiducial comprises:

a first section having a first reflectivity; and a second section adjacent to the first section, the second section having a second reflectivity different than the first reflectivity.

19. The method of claim 16, wherein the fiducial is disposed behind the LIDAR component within a body of the autonomous device.

20. The method of claim 16, wherein the distance data is first distance data indicative of one or more first distances between the LIDAR component and the one or more points on the fiducial, the method further comprising:

receiving, by the processor, and from the LIDAR component, second distance data indicative of one or more second distances between the LIDAR component and the one or more points on the fiducial disposed;

determining, by the processor, that a change in temperature has caused the one or more second distances to be different than the one or more first distances by an amount that is less than or equal to a threshold amount;

receiving, by the processor, and from the LIDAR component, third distance data indicative of one or more third distances between the LIDAR component and one or more points on a floor below the autonomous device; and adding the amount to, or subtracting the amount from, the one or more third distances to compensate for the change in temperature.

\* \* \* \* \*